US010199672B2

(12) United States Patent
Dong et al.

(10) Patent No.: US 10,199,672 B2
(45) Date of Patent: Feb. 5, 2019

(54) METHOD OF OPERATING REDOX FLOW BATTERY, AND REDOX FLOW BATTERY SYSTEM

(71) Applicant: Sumitomo Electric Industries, Ltd., Osaka-shi (JP)

(72) Inventors: Yongrong Dong, Osaka (JP); Hideki Miyawaki, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/537,581

(22) PCT Filed: Dec. 7, 2015

(86) PCT No.: PCT/JP2015/084279
§ 371 (c)(1),
(2) Date: Jun. 19, 2017

(87) PCT Pub. No.: WO2016/104124
PCT Pub. Date: Jun. 30, 2016

(65) Prior Publication Data
US 2018/0269512 A1    Sep. 20, 2018

(30) Foreign Application Priority Data

Dec. 22, 2014 (JP) ................................ 2014-259317

(51) Int. Cl.
*H01M 8/18* (2006.01)
*H01M 8/08* (2016.01)
(Continued)

(52) U.S. Cl.
CPC ............ *H01M 8/188* (2013.01); *H01M 2/40* (2013.01); *H01M 8/04186* (2013.01); *H01M 8/08* (2013.01)

(58) Field of Classification Search
CPC ...................................................... H01M 8/188
(Continued)

(56) References Cited

U.S. PATENT DOCUMENTS 7,820,321 B2 * 10/2010 Horne ................. B60L 11/1824
429/120
8,642,202 B2 * 2/2014 Sun ........................ B60L 11/005
252/182.1
(Continued)

FOREIGN PATENT DOCUMENTS

| JP | 2014-137946 A | 7/2014 |
|---|---|---|
| WO | 2011/111254 A1 | 9/2011 |
| WO | 2015/019972 A1 | 2/2015 |

*Primary Examiner* — Suresh Memula
(74) *Attorney, Agent, or Firm* — Venable LLP; Michael A. Sartori; Miguel A. Lopez

(57) ABSTRACT

Provided is a method of operating an RF battery in which charging and discharging are performed by circulating and supplying a positive electrode electrolyte in a positive electrode tank to a positive electrode and circulating and supplying a negative electrode electrolyte in a negative electrode tank to a negative electrode. The positive electrode electrolyte contains manganese ions and added metal ions. The negative electrode electrolyte contains at least one species of metal ions selected from the group consisting of titanium ions, vanadium ions, and chromium ions. The added metal ions are at least one selected from the group consisting of cadmium ions, tin ions, antimony ions, lead ions, and bismuth ions. The method of operating an RF battery includes a dissolution step in which, when metal precipitates, formed by reduction of the added metal ions which have moved from the positive electrode electrolyte to a circulating pathway of the negative electrode electrolyte, are contained in the circulating pathway of the negative electrode electrolyte, the metal precipitates are dissolved and ionized in the positive electrode electrolyte.

14 Claims, 6 Drawing Sheets

(51) Int. Cl.
*H01M 8/04186* (2016.01)
*H01M 2/40* (2006.01)

(58) Field of Classification Search
USPC .......................................................... 320/107
See application file for complete search history.

(56) References Cited

U.S. PATENT DOCUMENTS

| | | | |
|---|---|---|---|
| 8,927,130 B2 * | 1/2015 | Mun | H01M 8/188 |
| | | | 429/108 |
| 8,986,862 B2 * | 3/2015 | Park | B60L 11/005 |
| | | | 429/70 |
| 9,302,596 B2 * | 4/2016 | Park | B60L 11/1879 |
| 9,520,611 B2 * | 12/2016 | Park | H01M 8/188 |
| 2012/0045680 A1 | 2/2012 | Dong et al. | |
| 2016/0013506 A1 | 1/2016 | Dong et al. | |

* cited by examiner

METHOD OF OPERATING REDOX FLOW BATTERY, AND REDOX FLOW BATTERY SYSTEM

TECHNICAL FIELD

The present invention relates to a redox flow battery system in which a solution containing manganese ions is used as a positive electrode electrolyte, and a method of operating a redox flow battery. More particularly, the invention relates to a method of operating a redox flow battery in which it is possible to suppress precipitation of manganese dioxide in a positive electrode electrolyte over a long period of time, and a redox flow battery system.

BACKGROUND ART

In recent years, with the electric power shortage becoming more serious, rapid introduction of natural energy, such as wind power generation and photovoltaic power generation, and stabilization of electric power systems (e.g., maintenance of frequencies and voltages) have become issues to be addressed globally. As one of the measures to address the issues, installation of large-capacity storage batteries to achieve, for example, smoothing of output fluctuation, accumulation of surplus power, and load leveling has been receiving attention.

One of large-capacity storage batteries is a redox flow battery (hereinafter, may be referred to as an "RF battery"). The RF battery has characteristics such as (i) ease of capacity increase to a megawatt (MW) level, (ii) a long life, (iii) capability of accurately monitoring the state of charge (SOC) of the battery, and (iv) high design freedom such that battery output and battery capacity can be independently designed, and is expected to be a most suitable storage battery for stabilization of electric power systems.

An RF battery mainly includes a battery cell including a positive electrode to which a positive electrode electrolyte is supplied, a negative electrode to which a negative electrode electrolyte is supplied, and a membrane interposed between the two electrodes. Typically, an RF battery system is constructed, the system including the RF battery and a circulation mechanism for circulating and supplying electrolytes to the RF battery. The circulation mechanism usually includes a positive electrode tank that stores a positive electrode electrolyte, a negative electrode tank that stores a negative electrode electrolyte, and pipes that connect the two electrode tanks to the RF battery.

A solution containing, as an active material, metal ions whose valence is changed by oxidation-reduction is typically used as an electrolyte for each electrode. Typical examples include an Fe—Cr-based RF battery in which iron (Fe) ions are used as a positive electrode active material, and chromium (Cr) ions are used as a negative electrode active material, and a V-based RF battery in which vanadium (V) ions are used as an active material for both electrodes (refer to paragraph 0003 in the description of PTL 1).

PTL 1 discloses a Mn—Ti-based RF battery in which manganese (Mn) ions are used as a positive electrode active material, and titanium (Ti) ions and the like are used as a negative electrode active material. The Mn—Ti-based RF battery is advantageous in that it can generate a higher electromotive force than an existing V-based RF battery and that the material for the positive electrode active material is relatively inexpensive. Furthermore, PTL 1 discloses that by incorporating titanium ions, in addition to manganese ions, into the positive electrode electrolyte, it is possible to suppress generation of manganese dioxide ($MnO_2$), and $Mn^{2+}/Mn^{3+}$ reactions can be stably carried out.

CITATION LIST

Patent Literature

PTL 1: International Publication No. 2011/111254

SUMMARY OF INVENTION

Technical Problem

Regarding a redox flow battery in which a solution containing manganese ions is used as a positive electrode electrolyte, it is desired to suppress precipitation of manganese dioxide ($MnO_2$) over a long period of time.

As described above, in the Mn—Ti-based RF battery, by adding titanium ions to the positive electrode electrolyte, generation of manganese dioxide ($MnO_2$) can be suppressed. However, even in the positive electrode electrolyte into which, in addition to manganese ions, titanium ions are incorporated, $MnO_2$ can be generated when the battery is repeatedly used for a long period of time. That is, $MnO_2$ can be generated over time. For example, when the battery is operated in a standby mode with a high state of charge (SOC) of the positive electrode electrolyte, $MnO_2$ may be generated over time in some cases. When $MnO_2$ is precipitated, the amount of the positive electrode active material decreases, resulting in degradation in battery characteristics, such as a decreased energy density.

The present invention has been accomplished under the circumstances described above. It is an object of the present invention to provide a redox flow battery system in which it is possible to suppress precipitation of manganese dioxide in a positive electrode electrolyte over a long period of time, and a method of operating a redox flow battery.

Solution to Problem

A method of operating a redox flow battery according to an embodiment of the present invention relates to operation of a redox flow battery in which charging and discharging are performed by circulating and supplying a positive electrode electrolyte in a positive electrode tank to a positive electrode and circulating and supplying a negative electrode electrolyte in a negative electrode tank to a negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The method of operating a redox flow battery includes a dissolution step in which, when metal precipitates, formed by reduction of the added metal ions which have moved from the positive electrode electrolyte to a circulating pathway of the negative electrode electrolyte, are contained in the circulating pathway of the negative electrode electrolyte, the metal precipitates are dissolved and ionized in the positive electrode electrolyte.

A redox flow battery system according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte, a branching introducing pipe that supplies the positive electrode electrolyte from the positive electrode tank to the negative electrode when the metal precipitates are contained in the circulating pathway of the negative electrode electrolyte, and a branching return pipe that returns the solution which has passed through the negative electrode to the positive electrode tank.

A redox flow battery system according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte; a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe that supplies the mixed solution stored in the positive electrode tank to the negative electrode; and a branching return pipe that returns the solution which has passed through the negative electrode to the positive electrode tank.

A redox flow battery system according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte; a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe for negative electrode that supplies the mixed solution stored in the positive electrode tank to the negative electrode; a branching return pipe for negative electrode that returns the solution which has passed through the negative electrode to the positive electrode tank; a branching introducing pipe for positive electrode that supplies the mixed solution stored in the negative electrode tank to the positive electrode; and a branching return pipe for positive electrode that returns the solution which has passed through the positive electrode to the negative electrode tank.

A redox flow battery system according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte, and a filter portion that is provided in the circulating pathway of the negative electrode electrolyte and collects the metal precipitates.

Advantageous Effects of Invention

In the method of operating a redox flow battery, it is possible to suppress precipitation of manganese dioxide in the positive electrode electrolyte over a long period of time.

The redox flow battery system can be suitably used in carrying out the method of operating a redox flow battery. By carrying out the method of operating a redox flow battery by using the redox flow battery system, it is possible to suppress precipitation of manganese dioxide in the positive electrode electrolyte over a long period of time.

Figure 1:
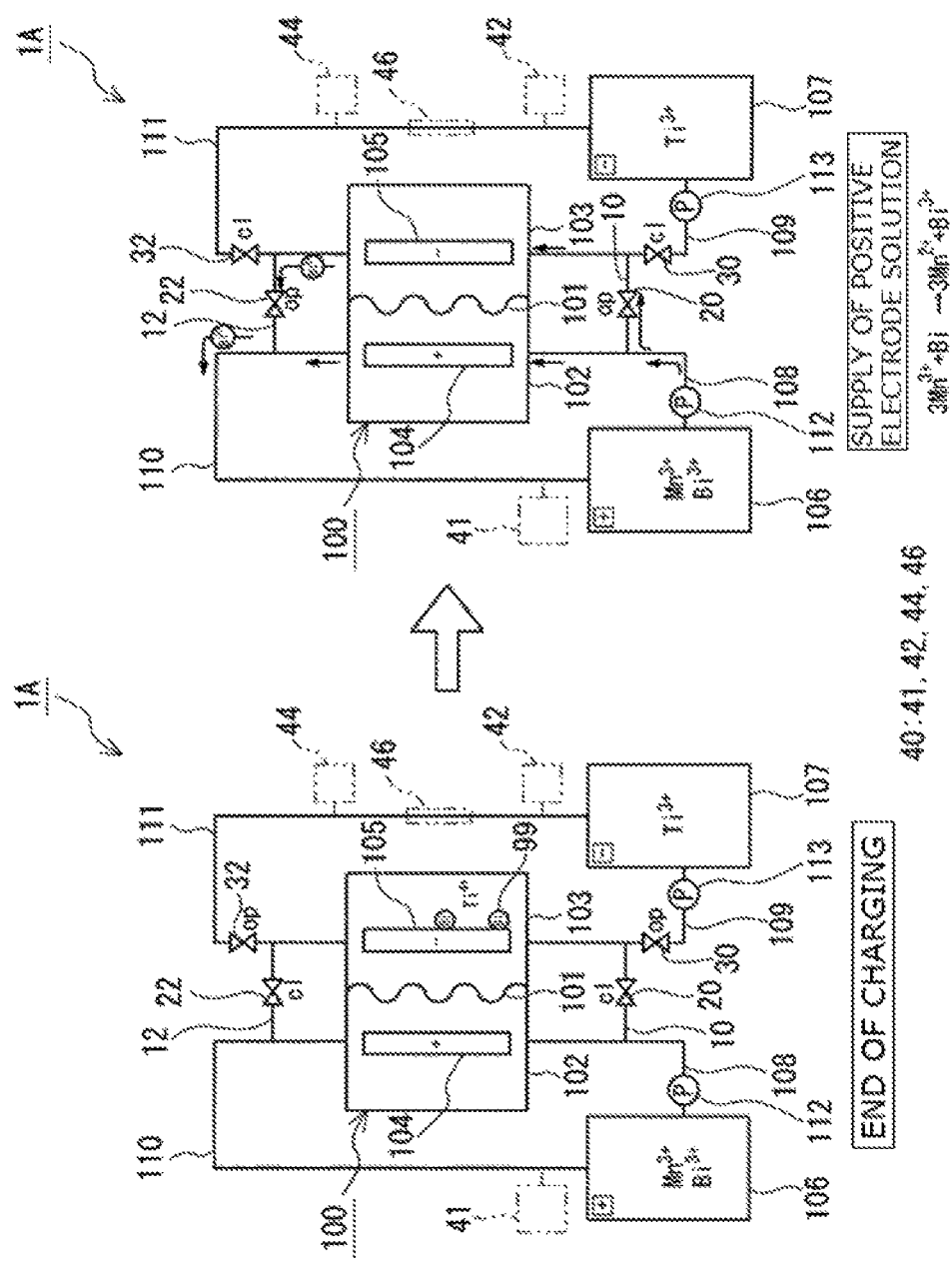
FIG. 1 is a diagram illustrating a procedure for carrying out a method of operating a redox flow battery according to Embodiment 1 by using a redox flow battery system according to Embodiment 1.

REFERENCE SIGNS LIST 1, 1A, 1B, 1C, 1D redox flow battery system (RF battery system)
  10, 16, 17 branching introducing pipe
  12, 18, 19 branching return pipe
  14 communicating pipe
  20, 22, 24, 26, 27, 28, 29 valve
  30, 32, 34, 35, 36, 37 valve
  40 detecting portion
  41, 42 SOC measuring unit
  44 flow meter
  46 transparent window
  50 filter portion
  99 metal precipitate
  100 battery cell
  101 membrane
  102 positive electrode cell
  103 negative electrode cell
  104 positive electrode
  105 negative electrode
  106 positive electrode tank
  107 negative electrode tank
  108, 109, 110, 111 pipe
  112, 113 pump
  200 alternating current/direct current converter
  210 transforming equipment
  300 power generation unit
  400 load

DESCRIPTION OF EMBODIMENTS

Description of Embodiments of the Present Invention

Regarding a redox flow battery in which a solution containing manganese ions as a positive electrode active material is used as a positive electrode electrolyte, the present inventors have conducted studies on the structure in which it is possible to suppress precipitation of, in particular, manganese dioxide ($MnO_2$) among precipitates that can be generated in flow paths of electrolytes. As a result, it has been found that addition of particular metal ions to the positive electrode electrolyte is effective in suppressing precipitation of $MnO_2$. However, it has been found that the added metal ions may be mixed from the positive electrode electrolyte to the negative electrode electrolyte, for example, owing to electrolyte crossover (a phenomenon in which the electrolyte of one electrode moves through a membrane to the other electrode) which can occur over time, and furthermore, the added metal ions which have been mixed may be reduced at the negative electrode and precipitated. When the added metal ions are precipitated on the negative electrode, the problems described below will arise.

(Positive electrode) Since the amount of added metal ions in the positive electrode electrolyte decreases, precipitation of manganese dioxide ($MnO_2$) cannot be sufficiently suppressed and $MnO_2$ is precipitated. Because of the precipitation of $MnO_2$, manganese ions which are a positive electrode active material decrease in amount, resulting in a decreased energy density.

(Negative electrode) The charged negative electrode active material (hereinafter, may be referred to as "charged ions of the negative electrode") has high reducing power and, therefore, reduces the added metal ions. The added metal ions which have been reduced are precipitated as a solid metal. Because of the reduction, the charged ions of the negative electrode become a discharged negative electrode active material (hereinafter, may be referred to as "discharged ions of the negative electrode"). Therefore, the amount of charged ions of the negative electrode decreases, resulting in a decrease in the SOC of the negative electrode electrolyte. When many charged ions of the negative electrode are used to reduce the added metal ions, the SOC of the negative electrode electrolyte is significantly decreased. An increase in the difference in the SOC between the electrolytes of the two electrodes due to the decrease in the SOC of the negative electrode electrolyte may lead to degradation in battery characteristics, such as a significant decrease in battery capacity compared with the state at the beginning of the operation. Furthermore, the precipitation of the solid metal may cause clogging of the negative electrode, resulting in a decreased flow rate of the electrolyte, a pressure loss due to an increase in flow pressure, or the like.

On the other hand, the charged positive electrode active material (e.g., $Mn^{3+}$; hereinafter, may be referred to as "charged Mn ions") contained in the positive electrode electrolyte has high oxidizing power. Therefore, by dissolving and ionizing the solid metal formed by precipitation of the added metal ions in the positive electrode electrolyte containing charged Mn ions, i.e., by converting the solid metal precipitates into the added metal ions, it is possible to bring the liquid composition of the positive electrode electrolyte back to the state at the beginning of the operation, including the unused state. In other words, the liquid composition of the positive electrode electrolyte can be maintained in the substantially unused state or in the state at the beginning of the operation. The present invention is based on the above-described findings.

First, the contents of the embodiments of the present invention will be enumerated and described.

(1) A method of operating a redox flow battery (RF battery) according to an embodiment of the present invention relates to operation of a redox flow battery in which charging and discharging are performed by circulating and supplying a positive electrode electrolyte in a positive electrode tank to a positive electrode and circulating and supplying a negative electrode electrolyte in a negative electrode tank to a negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The method of operating an RF battery includes a dissolution step in which, when metal precipitates, formed by reduction of the added metal ions which have moved from the positive electrode electrolyte to a circulating pathway of the negative electrode electrolyte, are contained in the circulating pathway of the negative electrode electrolyte, the metal precipitates are dissolved and ionized in the positive electrode electrolyte.

The circulating pathway of the negative electrode electrolyte typically includes a battery cell including the negative electrode, the negative electrode tank, and a pipe that connects the battery cell to the negative electrode tank.

In the method of operating an RF battery, since the positive electrode electrolyte contains specific added metal ions, it is possible to suppress precipitation of manganese dioxide ($MnO_2$) in the positive electrode electrolyte. In particular, in the method of operating an RF battery, in the case where the specific added metal ions are mixed from the positive electrode electrolyte to the circulating pathway of the negative electrode electrolyte over time, and further present in the form of metal precipitates, i.e., in the case where the amount of the added metal ions in the positive electrode electrolyte is decreased from the state at the beginning of the operation, the metal precipitates are dissolved and ionized in the positive electrode electrolyte. In the method of operating an RF battery, by performing a simple operation of converting the metal precipitates back into the added metal ions, i.e., dissolving the metal precipitates in the positive electrode electrolyte, at an appropriate interval, typically, during a standby period provided between charging and discharging, the liquid composition of the positive electrode electrolyte can be made substantially the same as the liquid composition in the unused state or at the beginning of the operation. Consequently, in the method of operating an RF battery, the effect of suppressing precipitation of $MnO_2$ due to incorporation of the specific added metal ions into the positive electrode electrolyte can be maintained over a long period of time.

The precipitation mechanism of added metal ions and problems associated with the precipitation in the negative electrode will be described in detail below. First, regarding the metal ions which are contained in the negative electrode electrolyte and serve as a negative electrode active material (hereinafter, may be referred to as "negative electrode metal ions") and the added metal ions, potential relationships will be described.

The standard redox potentials of the negative electrode metal ions serving as a negative electrode active material are as follows:

| | |
|---|---|
| $Ti^{3+}/Ti^{4+}$ | 0.1 V |
| $V^{2+}/V^{3+}$ | −0.26 V |
| $Cr^{2+}/Cr^{3+}$ | −0.42 V |

The standard redox potentials of the added metal ions are as follows:

| | |
|---|---|
| $Cd/Cd^{2+}$ | −0.4 V |
| $Sn/Sn^{2+}$ | −0.14 V |
| $Sb/Sb^{3+}$ | 0.21 V |
| $Pb/Pb^{2+}$ | −0.13 V |
| $Bi/Bi^{3+}$ | 0.22 V |

Although depending on the combination of the negative electrode metal ions and the added metal ions, the standard oxidation potential of the added metal ions can be generally higher than the redox potential of the negative electrode metal ions. For example, $Sb/Sb^{3+}$ and $Bi/Bi^{3+}$ can have a higher potential than any of the negative electrode metal ions described above. That is, the added metal ions are likely to be reduced. When mixed in the negative electrode electrolyte, the added metal ions are likely to be reduced by charged ions of the negative electrode, for example, $Ti^+$, to become a solid metal (metal precipitates).

The charged ions of the negative electrode are oxidized by the reduction of the added metal ions to become discharged ions of the negative electrode, for example, $Ti^{4+}$. The precipitation phenomenon due to the reduction of the added metal ions is considered to be likely to occur, for example, at the end of charging when the largest amount of charged ions of the negative electrode can be present. Accordingly, for example, when the battery is on standby at the end of charging, because of the precipitation phenomenon due to the reduction of the added metal ions, the amount of charged ions of the negative electrode decreases, and the amount of discharged ions of the negative electrode increases, resulting in a decrease in the SOC of the negative electrode electrolyte. As a result, the difference between the SOC of the positive electrode electrolyte and the SOC of the negative electrode electrolyte increases, resulting in a decrease in battery capacity. In the case where the SOC of the negative electrode electrolyte is high to a certain extent, e.g., 50% or more, similarly, although a relatively large amount of charged ions of the negative electrode is present, because of the precipitation phenomenon due to the reduction of the added metal ions, the difference in the SOC between the electrolytes of the two electrodes can be increased.

As described above, when the added metal ions move from the positive electrode electrolyte to the negative electrode electrolyte, in the positive electrode, it is not possible to maintain the effect of suppressing precipitation of manganese dioxide for a long period of time because of a decrease in the amount of added metal ions. In the negative electrode, in the case where the added metal ions in the form of a solid metal are present in the negative electrode electrolyte, this leads to a decrease in the SOC of the negative electrode electrolyte, an increase in the difference in the SOC between the electrolytes of the two electrolytes, a decrease in battery capacity, a decrease in the flow rate of the negative electrode electrolyte, an increase in flow resistance, and the like. When such metal precipitates are present, by carrying out the method of operating an RF battery, the added metal ions which have moved from the positive electrode electrolyte to the negative electrode electrolyte can be recovered into the positive electrode electrolyte. Furthermore, by carrying out the method of operating an RF battery at the appropriate time during use of the RF battery, the liquid composition in the unused state or at the beginning of the operation can be sufficiently maintained while allowing (to a certain extent) mixing and precipitation of the added metal ions from the positive electrode electrolyte to the circulating pathway of the negative electrode electrolyte.

(2) In an example of the method of operating an RF battery according to the embodiment, in the dissolution step, when the metal precipitates are precipitated on the negative electrode, the metal precipitates precipitated on the negative electrode may be dissolved by supplying the positive electrode electrolyte at the end of charging to the negative electrode.

The positive electrode electrolyte at the end of charging contains charged Mn ions in sufficient amounts. Charged Mn ions have high oxidizing power. On the other hand, when the SOC of the negative electrode electrolyte is sufficiently high, such as at the end of charging, since the solubility of metal precipitates decreases, added metal ions are likely to be present as metal precipitates. In particular, the vicinity of the negative electrode which easily receives electrons is mentioned as the area in which the added metal ions which have been mixed in the negative electrode electrolyte are likely to be reduced to become metal precipitates. In the embodiment described above, since the positive electrode electrolyte containing charged Mn ions is supplied to the negative electrode that can hold the metal precipitates in such a manner, by dissolving and ionizing the metal precipitates, the added metal ions can be easily recovered into the positive electrode electrolyte. Furthermore, by pressure-feeding the positive electrode electrolyte with a pump or the like, metal precipitates adhering to the negative electrode can be swept away into the positive electrode tank. The metal precipitates gathered in the positive electrode tank can be dissolved and ionized by the charged Mn ions that are present in sufficient amounts in the positive electrode tank and, therefore, the added metal ions can be easily recovered into the positive electrode electrolyte. Consequently, by carrying out the embodiment, precipitation of manganese dioxide in the positive electrode electrolyte can be satisfactorily suppressed over a long period of time. This embodiment can be suitably used for a period when metal precipitates are likely to be present in the vicinity of the negative electrode, for example, for a period when the elapsed time from the start of operation is relatively short. The reason for this is that it is thought that the period when added metal ions before becoming metal precipitates are likely to be present in the vicinity of the negative electrode is immediately after and close to electrolyte crossover.

(3) In an example of the method of operating an RF battery according to the embodiment (2), the method may include, before the dissolution step, a mixing step in which, at the end of discharging, the positive electrode electrolyte in the positive electrode tank and the negative electrode electrolyte in the negative electrode tank are mixed to form a mixed solution, and a charging step in which the mixed solution is charged so that the added metal ions contained in the mixed solution in the negative electrode tank are precipitated on the negative electrode.

At the end of discharging, the SOC of the negative electrode electrolyte is low, the solubility of the metal precipitates tends to increase, and the added metal ions mixed in the negative electrode electrolyte are likely to be present in the form of ions. Depending on discharging conditions, substantially only the added metal ions can be made to be present. However, in the case where the amount of added metal ions moved to the negative electrode increases and exceeds the solubility limit, the negative electrode electrolyte can contain, to a certain extent, metal precipitates. However, even in such a case, when the electrolytes are mixed, the SOC can be decreased by self-discharge. Therefore, the solubility is increased, and the proportion of added metal ions can be increased. That is, by mixing the two electrode electrolytes at the end of discharging, the added metal ions can be made to be present in the two electrode tanks more reliably. When the mixed solution is charged, the added metal ions can be precipitated on the negative electrode. The reason for this is that since the charging potential of the battery cell is higher than the potential of the negative electrode electrolyte at the end of discharging, the reduction reaction of added metal ions having a high standard redox potential is more likely to occur than the redox reaction of charged ions of the negative electrode with added metal ions in the negative electrode electrolyte. In the embodiment described above, the added metal ions present in the negative electrode tank can be precipitated on the negative electrode. That is, the added metal ions can be moved from the inside of the negative electrode tank and the like to the vicinity of the negative electrode. When the mixed solution in the positive electrode tank is supplied to the metal precipitates on the negative electrode, since the amount of charged Mn ions in the mixed solution inside the positive electrode tank has been increased by charging, the metal precipitates can be dissolved and ionized. That is, in the embodiment described above, as in (2), the added metal ions can be easily recovered into the mixed solution which is the positive electrode electrolyte. Consequently, by performing the embodiment described above, precipitation of manganese dioxide in the positive electrode electrolyte can be satisfactorily suppressed over a long period of time. By repeating a plurality of times the mixing step and the charging step, the added metal ions can be more reliably recovered. Since ions that can be present in the electrolyte after mixing are common to the two electrodes, this embodiment can be easily used in the case where the two electrode electrolytes before mixing contain manganese ions and negative electrode metal ions. In particular, in the case where the negative electrode metal ions are titanium ions, precipitation of manganese dioxide can be also suppressed by the titanium ions. Furthermore, in the embodiment described above, since the positive electrode electrolyte at the end of discharging and the negative electrode electrolyte at the end of discharging are mixed, it is possible to reduce a loss due to self-discharge in which ions serving as active materials of the two electrodes react with each other.

The embodiment (3) is considered to be easily used for a period when the added metal ions can be present inside the negative electrode tank, e.g., in the case where the elapsed time from the start of operation is sufficiently large. The reason for this is that it is thought that a certain time is required for the added metal ions mixed in the battery cell by electrolyte crossover to be transported to the negative electrode tank via a pipe and the like. Regarding the period of use, the same applies to the embodiment (4) which will be described below.

(4) In an example of the method of operating an RF battery, the method may include a mixing step in which, when the state of charge is 50% or more, the positive electrode electrolyte in the positive electrode tank and the negative electrode electrolyte in the negative electrode tank are mixed to form a mixed solution, and a charging step in which the mixed solution is charged so that the added metal ions contained in the mixed solution in the negative electrode tank are precipitated and the metal precipitates are made to be present in the negative electrode tank. The dissolution step may include switching between the negative electrode tank that stores the mixed solution containing the metal precipitates and the positive electrode tank, and charging the mixed solution in the exchanged positive electrode tank.

In the case where the state of charge (SOC) is 50% or more, since the solubility of metal precipitates in the negative electrode electrolyte is low to a certain extent, the added metal ions mixed into the negative electrode electrolyte are likely to be reduced by charged ions of the negative electrode and present in the form of metal precipitates. The metal precipitates are heavier than negative electrode metal ions and, therefore, are likely to settle and be deposited inside the negative electrode tank. When the negative electrode electrolyte containing metal precipitates in the negative electrode tank and the positive electrode electrolyte containing added metal ions in the positive electrode tank are mixed, the added metal ions contained in the positive electrode electrolyte can be substantially equally distributed to the positive electrode tank and the negative electrode tank. The reason for this is that it is thought that the rate of diffusion of added metal ions in the positive electrode electrolyte inside the negative electrode tank is higher than the rate at which metal precipitates are ionized and stabilized by the redox reaction of charged Mn ions contained in the negative electrode electrolyte with the metal precipitates inside the negative electrode tank. Accordingly, in the negative electrode tank, the metal precipitates remain substantially as they are, and a mixed solution containing about half of the amount of the added metal ions introduced from the positive electrode tank is stored. When the mixed solution is charged, the added metal ions inside the negative electrode tank are mainly reduced by charged ions of the negative electrode that can be present in the vicinity thereof to become metal precipitates. The mixing step and the charging step may be performed once, but by repeating a plurality of times, substantially all of the amount of the added metal ions which have been contained in the positive electrode electrolyte can be moved to the negative electrode tank and collected as metal precipitates.

After the metal precipitates are collected in the negative electrode tank as described above, the negative electrode tank is changed to the positive electrode tank by switching between the two electrode tanks, and by charging the mixed solution in each electrode tank, the metal precipitates in the exchanged positive electrode tank can be oxidized by charged Mn ions and the like that can be present in the vicinity thereof to the added metal ions. As a result, the mixed solution containing the added metal ions can be used as a new positive electrode electrolyte. Consequently, by carrying out the embodiment, precipitation of manganese dioxide in the positive electrode electrolyte can be satisfactorily suppressed over a long period of time. Since ions that can be present in the electrolyte after mixing are common to the two electrodes, this embodiment can be easily used in the case where the two electrode electrolytes before mixing contain manganese ions and negative electrode metal ions. In particular, in the case where the negative electrode metal ions are titanium ions, precipitation of manganese dioxide can be also suppressed by the titanium ions.

(5) In an example of the method of operating an RF battery according to the embodiment (4), the mixing step and the charging step may be repeated a plurality of times.

In the embodiment (4), by increasing the number of repeats of the mixing step and the charging step, a sufficient amount of the added metal ions, preferably, substantially all of the amount of the added metal ions, can be moved from the positive electrode tank to the negative electrode tank and efficiently collected as metal precipitates in the negative electrode tank. As a result, in the embodiment, the liquid composition of the positive electrode electrolyte can be brought close to the unused state or the state at the beginning of the operation. Preferably, in the embodiment, the liquid composition of the positive electrode electrolyte can be made substantially the same as the liquid composition in the unused state.

(6) In an example of the method of operating an RF battery, the method may include a collection step in which the metal precipitates are collected by a filter portion provided in the circulating pathway of the negative electrode electrolyte, and in the dissolution step, the collected metal precipitates may be dissolved in the positive electrode electrolyte.

In the embodiment, even in the case where the added metal ions mixed into the negative electrode electrolyte in the form of metal precipitates can be present in any portion, such as the negative electrode, inside the negative electrode tank, or inside the pipe that connects the battery cell and the negative electrode tank, by circulating the negative electrode electrolyte, the metal precipitates can be easily collected. By feeding the collected metal precipitates into the positive electrode tank and the like so as to be dissolved in the positive electrode electrolyte, the metal precipitates can be recovered as added metal ions in the positive electrode electrolyte. When the metal precipitates are fed at the end of charging when charged Mn ions are sufficiently present, the metal precipitates are easily dissolved in the positive electrode electrolyte. Even in the case where charged Mn ions are not sufficiently present in the positive electrode electrolyte, by performing charging after feeding the metal precipitates, the metal precipitates can be easily dissolved. Consequently, by carrying out the embodiment, precipitation of manganese dioxide in the positive electrode electrolyte can be satisfactorily suppressed over a long period of time.

As the RF battery system used in the method of operating an RF battery, for example, an RF battery system described below may be mentioned.

(7) A redox flow battery system (RF battery system) according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte, a branching introducing pipe that supplies the positive electrode electrolyte from the positive electrode tank to the negative electrode when the metal precipitates are contained in the circulating pathway of the negative electrode electrolyte, and a branching return pipe that returns the solution which has passed through the negative electrode to the positive electrode tank.

The RF battery system can be suitably used, for example, in carrying out the method of operating an RF battery according to (2). Since the RF battery system includes the detecting portion, by using information obtained from the detecting portion, it is possible to easily determine the presence or absence of metal precipitates and the amount of precipitation in the negative electrode electrolyte. For example, when it is considered that metal precipitates can be present in large amounts, more specifically, at the end of charging and when it is considered that metal precipitates are precipitated on the negative electrode, the RF battery system can supply the positive electrode electrolyte from the positive electrode tank to the negative electrode via the branching introducing pipe, and can return the solution which has passed through the negative electrode to the positive electrode tank via the branching return pipe. The solution which has passed through the negative electrode contains metal precipitates swept away from the negative electrode and contains added metal ions which have been ionized by reaction between metal precipitates and charged Mn ions in the positive electrode electrolyte. The metal precipitates introduced into the positive electrode tank are ionized by reaction with charged Mn ions in the positive electrode tank as described above. Consequently, in the RF battery system, metal precipitates can be recovered as added metal ions in the positive electrode electrolyte. Furthermore, in the RF battery system, by carrying out the method of operating an RF battery according to (2) at the appropriate time, it is possible to satisfactorily suppress precipitation of manganese dioxide in the positive electrode electrolyte over a long period of time.

(8) A redox flow battery system (RF battery system) according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte; a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe that supplies the mixed solution stored in the positive electrode tank to the negative electrode; and a branching return pipe that returns the solution which has passed through the negative electrode to the positive electrode tank.

The RF battery system can be suitably used, for example, in carrying out the method of operating an RF battery according to (3). Since the RF battery system includes the detecting portion, by using information obtained from the detecting portion, it is possible to easily determine the presence or absence of metal precipitates and the amount of precipitation in the negative electrode electrolyte. For example, in the case where it is considered that the added metal can be present in large amounts in the form of ions in the negative electrode electrolyte, more specifically, at the end of discharging, the RF battery system can easily mix the electrolytes in the two electrode tanks via the communicating pipe, and after mixing, by charging the mixed solution, the added metal ions contained in the mixed solution on the negative electrode side can be precipitated on the negative electrode. As in the RF battery system according to (7), the RF battery system can supply the solution in the positive electrode tank from the positive electrode tank to the negative electrode via the branching introducing pipe, and can return the solution which has passed through the negative electrode to the positive electrode tank via the branching return pipe. As in the RF battery system according to (7), the solution which has been returned to the positive electrode tank contains metal precipitates and added metal ions, and the metal precipitates are ionized. Consequently, in the RF battery system, metal precipitates can be recovered as added metal ions in the mixed solution serving as the positive electrode electrolyte. Furthermore, in the RF battery system, by carrying out the method of operating an RF battery according to (3) at the appropriate time, it is possible to satisfactorily suppress precipitation of manganese dioxide in the positive electrode electrolyte over a long period of time.

(9) A redox flow battery system (RF battery system) according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte; a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe for negative electrode that supplies the mixed solution stored in the positive electrode tank to the negative electrode; a branching return pipe for negative electrode that returns the solution which has passed through the negative electrode to the positive electrode tank; a branching introducing pipe for positive electrode that supplies the mixed solution stored in the negative electrode tank to the positive electrode; and a branching return pipe for positive electrode that returns the solution which has passed through the positive electrode to the negative electrode tank.

The RF battery system can be suitably used, for example, in carrying out the method of operating an RF battery according to (4). Since the RF battery system includes the detecting portion, by using information obtained from the detecting portion, it is possible to easily determine the presence or absence of metal precipitates and the amount of precipitation in the negative electrode electrolyte. For example, in the case where it is considered that metal precipitates can be present in large amounts in the negative electrode tank, more specifically, the SOC is 50% or more, the RF battery system can easily mix the electrolytes in the two electrode tanks via the communicating pipe, and as described above, a mixed solution containing about half of the amount of the added metal ions which have been contained in the positive electrode electrolyte can be stored in each of the electrode tanks. In the negative electrode tank, the metal precipitates remain substantially as they are. In the RF battery system, such a mixed solution can be charged, and as described above, the added metal ions in the mixed solution inside the negative electrode tank can be collected as metal precipitates. Preferably, in the RF battery system, by repeatedly performing mixing of the two electrode electrolytes by opening the communicating pipe and charging after the mixing, as described above, substantially all of the amount of the added metal ions which have been contained in the positive electrode electrolyte can be collected as metal precipitates in the negative electrode tank.

Furthermore, since the RF battery system includes the specific branching introducing pipes and branching return pipes, after the charging, the negative electrode tank that stores the mixed solution containing the metal precipitates can be changed to the positive electrode tank. In detail, in the RF battery system, the electrolyte (mixed solution) containing metal precipitates stored in the negative electrode tank can be considered as the positive electrode electrolyte and can be introduced to the positive electrode via the branching introducing pipe for positive electrode, and the solution which has passed through the positive electrode can be returned to the negative electrode tank considered as the positive electrode tank via the branching return pipe for positive electrode. The metal precipitates in the negative electrode tank considered as the positive electrode tank can be converted into added metal ions by reaction with charged Mn titanium or appropriate charging. In the RF battery system, the electrolyte (mixed solution) stored in the positive electrode tank, in which the amount of the added metal ions is decreased, preferably, the added metal ions are substantially removed, can be considered as the negative electrode electrolyte and can be introduced to the negative electrode via the branching introducing pipe for negative electrode. The solution which has passed through the negative electrode can be returned to the positive electrode tank considered as the negative electrode tank via the branching return pipe for negative electrode. Consequently, in the RF battery system, metal precipitates can be recovered as added metal ions in the mixed solution serving as the positive electrode electrolyte. Furthermore, in the RF battery system, by carrying out the method of operating an RF battery according to (4) at the appropriate time, it is possible to satisfactorily suppress precipitation of manganese dioxide in the positive electrode electrolyte over a long period of time.

(10) A redox flow battery system (RF battery system) according to an embodiment of the present invention includes a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode.

The positive electrode electrolyte contains manganese ions and added metal ions.

The negative electrode electrolyte contains at least one species of metal ions selected from the group consisting of titanium ions, vanadium ions, and chromium ions.

The added metal ions are at least one selected from the group consisting of cadmium ions, tin ions, antimony ions, lead ions, and bismuth ions.

The redox flow battery system includes a detecting portion that detects the existence of metal precipitates formed by reduction of the added metal ions which have moved from the positive electrode electrolyte to a circulating pathway of the negative electrode electrolyte, and a filter portion that is provided in the circulating pathway of the negative electrode electrolyte and collects the metal precipitates.

The RF battery system can be suitably used, for example, in carrying out the method of operating an RF battery according to (6). Since the RF battery system includes the detecting portion, by using information obtained from the detecting portion, it is possible to easily determine the presence or absence of metal precipitates and the amount of precipitation in the negative electrode electrolyte. For example, in the RF battery system, when it is considered that metal precipitates can be present in large amounts, the metal precipitates collected by the filter portion can be fed into and dissolved in the positive electrode tank and the like. Since the RF battery system can be appropriately charged after feeding the metal precipitates, the metal precipitates can be more reliably dissolved. Consequently, in the RF battery system, metal precipitates can be recovered as added metal ions into the positive electrode electrolyte. Furthermore, in the RF battery system, by carrying out the method of operating an RF battery according to (6) at the appropriate time, it is possible to satisfactorily suppress precipitation of manganese dioxide in the positive electrode electrolyte over a long period of time. In addition, in the RF battery system, since the filter portion can be made to serve as the detecting portion, a detecting portion independent from the filter portion may not be provided.

(11) In an example of the RF battery system, the detecting portion may include at least one selected from an SOC measuring unit capable of measuring the state of charge of the positive electrode electrolyte and the state of charge of the negative electrode electrolyte, a transparent window provided in the circulating pathway of the negative electrode electrolyte, and a flow meter provided in the circulating pathway of the negative electrode electrolyte.

In the RF battery system according to the embodiment described above, it is possible to easily recognize the presence or absence of metal precipitates that can be contained and the amount of precipitation in the negative electrode electrolyte. In the case where the RF battery system includes an SOC measuring unit, when the two electrode electrolytes have different SOCs, and the difference thereof is large, more specifically, the difference in the SOC is equal to or more than the predetermined threshold value, it can be determined that the amount of metal precipitates is large. The reason for this is that it is thought that, as described above, when metal precipitates are present in the negative electrode electrolyte, charged ions of the negative electrode are reduced to increase the amount of discharged ions of the negative electrode, and the SOC of the negative electrode electrolyte decreases, resulting in an increase in the difference in the SOC. Furthermore, when the difference in the SOC is large, the RF battery system can also determine that the amount of the added metal ions is large in the negative electrode electrolyte. Accordingly, when the two electrode electrolytes have different SOCs, while appropriately checking the difference in the SOC, the RF battery system performs an operation of recovering the added metal ions into the positive electrode electrolyte such that the difference in the SOC decreases, preferably, the SOCs of the two electrode electrolytes are substantially equal to each other. When the RF battery system is provided with the SOC measuring unit, while checking the SOCs of the two electrode electrolytes in such a manner, the recovery operation can be performed. Such an SOC measuring unit may be provided on each electrode tank, a pipe, or the like.

In the case where the RF battery system includes a transparent window, it is possible to easily determine the presence or absence and the amount of metal precipitates, for example, by visual checking. Alternatively, the RF battery system can measure the degree of transparency of the transparent window. The degree of transparency decreases when metal precipitates adhere to the transparent window. Therefore, it is possible to easily determine the presence or absence and the amount of metal precipitates on the basis of the degree of transparency. An operation of recovering added metal ions into the positive electrode electrolyte is performed until the metal precipitates become invisible or the degree of transparency increases. When the RF battery system is provided with the transparent window, while checking the metal precipitates in such a manner, the recovery operation can be performed. The transparent window may be provided on a pipe or the like.

In the case where the RF battery system includes a flow meter, for example, when the flow rate of the negative electrode electrolyte is low, more specifically, equal to or less than the set threshold value, it can be determined that the amount of the metal precipitates is large. The reason for this is that it is thought that, when metal precipitates are present in the negative electrode electrolyte, the negative electrode electrolyte becomes unlikely to flow smoothly because of heavy metal precipitates included, clogging of the negative electrode, or the like. The RF battery system performs an operation of recovering added metal ions into the positive electrode electrolyte until the flow rate increases, i.e., exceeds the threshold value. When the RF battery system is provided with the flow meter, while checking the flow rate state in such a manner, the recovery operation can be performed. The flow meter may be provided on a pipe or the like.

(12) In an example of the RF battery system, the positive electrode electrolyte and the negative electrode electrolyte may both contain manganese ions and titanium ions.

The RF battery system according to the embodiment described above is a Mn—Ti-based RF battery system in which manganese ions are used as a positive electrode active material, and titanium ions are used as a negative electrode active material. In the RF battery system according to the embodiment, since the positive electrode electrolyte contains titanium ions, precipitation of manganese dioxide can be further suppressed. Furthermore, in the embodiment, a plurality of species of ions present in the positive electrode electrolyte are identical to those present in the negative electrode electrolyte. Therefore, the RF battery system according to the embodiment has advantages such as that (i) it is possible to easily avoid a decrease in battery capacity due to a relative decrease in active material ions originally reactive in each electrode because of movement of manganese ions to the negative electrode and movement of titanium ions to the positive electrode; (ii) correction is easily made even in the case where electrolyte crossover occurs over time as a result of charging and discharging, resulting in a variation in the amount of the electrolyte between the two electrodes; and (iii) excellent electrolyte manufacturability is exhibited. From these viewpoints, the RF battery system according to the embodiment is practical and expected to be easy to use. In particular, in the RF battery systems according to (8) and (9), since the two electrode electrolytes are actively mixed, after the mixing, the embodiment described above can be realized. In the RF battery systems according to (8) and (9), it is easy to use an electrolyte containing both manganese ions and negative electrode metal ions as the electrolyte of each of the two electrodes before mixing. Furthermore, in the RF battery system in which the added metal ions can be recovered into the positive electrode electrolyte, the two electrode electrolytes are allowed to contain the added metal ions. That is, in the RF battery system according to the embodiment, although the same electrolyte can be used for the two electrodes, it is preferable that only the positive electrode electrolyte contain the added metal ions.

(13) In an example of the RF battery system, the concentration of the added metal ions (total concentration in the case of a plurality of species) in the positive electrode electrolyte may be 0.001 to 1 M. "M", which denotes the unit of concentration, means the molarity, i.e., mol/L (mole/liter). Hereinafter, regarding the concentration, the same applies.

In the RF battery system according to the embodiment described above, since the positive electrode electrolyte contains the added metal ions in the specific range described above, it is possible to effectively suppress generation of manganese dioxide ($MnO_2$). Although the concentration of the added metal ions in the positive electrode electrolyte may be decreased by electrolyte crossover or the like over time, the added metal ions can be recovered into the positive electrode electrolyte in the RF battery system. By setting the concentration of the added metal ions in the range described above, and by performing the operation of recovering the added metal ions into the positive electrode electrolyte so as to satisfy this range, the RF battery system can satisfy the range described above from the beginning of operation over a long period of time.

(14) In an example of the RF battery system, at least one of the concentration of the manganese ions in the positive electrode electrolyte and the concentration of the metal ions (negative electrode metal ions) in the negative electrode electrolyte may be 0.3 to 5 M. In the case where a plurality of species of metal ions (negative electrode metal ions) are contained in the negative electrode electrolyte, the concentration corresponds to the total concentration.

Since the RF battery system according to the embodiment described above contains the manganese ions and the negative electrode metal ions, each serving as the active material of the electrode, in the specific range described above, the following advantages are exhibited: (i) a sufficiently large amount of the metal element that undergoes a valence-change reaction is contained and a high energy density can be achieved, and (ii) dissolution can be satisfactorily performed even in the case where the electrolyte is an acid aqueous solution, and excellent electrolyte manufacturability is exhibited.

DETAILED DESCRIPTION OF EMBODIMENTS OF THE PRESENT INVENTION

The redox flow battery system (RF battery system) and the method of operating an RF battery according to the embodiments of the present invention will be described in detail below with reference to the drawings. In the drawings, the same reference signs denote the same components.

Figure 7:
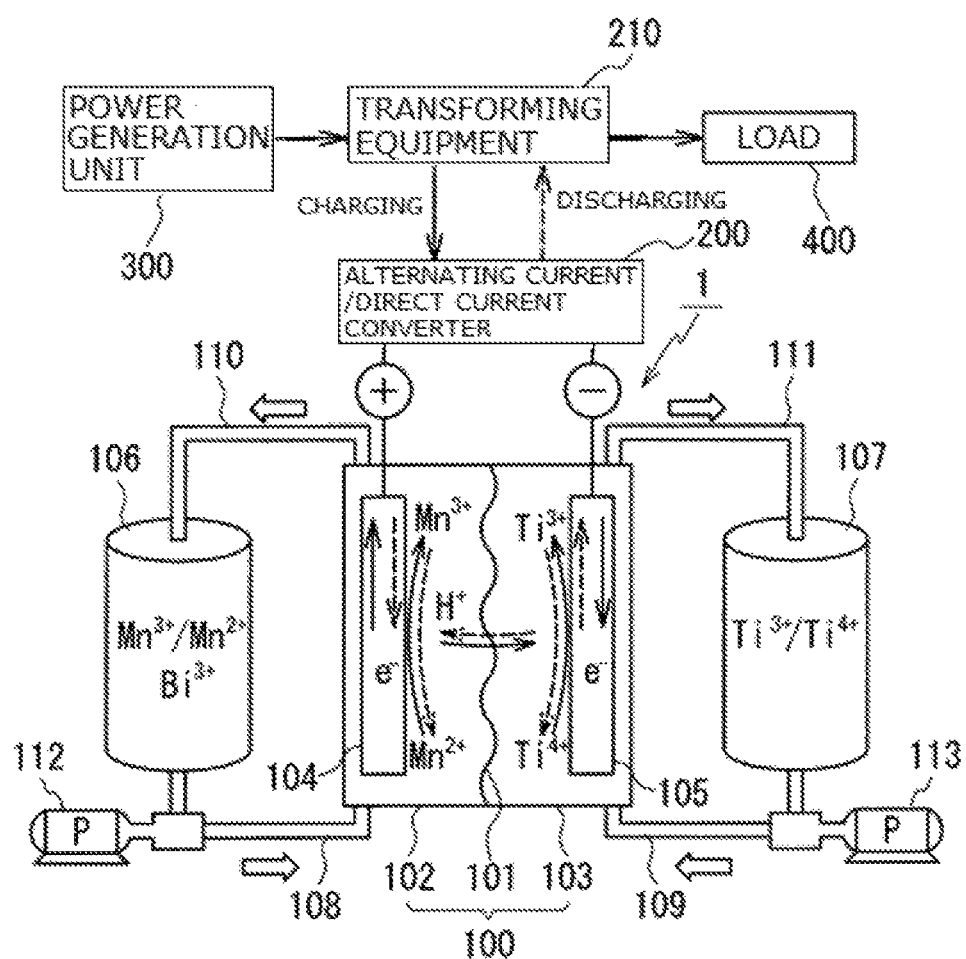
FIG. 7 is a schematic diagram showing a basic structure of the redox flow battery system according to each of Embodiments 1 to 4 and a basic operating principle.

First, with reference to FIG. 7, the basic structure of an RF battery system 1 including an RF battery will be described and next, electrolytes used in the RF battery system according to the embodiment will be described. Then, RF battery systems 1A to 1D according to Embodiments 1 to 4 and methods of operating an RF battery according to Embodiments 1 to 4, which use the RF battery systems 1A to 1D, respectively, will be described for each embodiment. Hereinafter, in the drawings, ions shown inside a positive electrode tank 106 and a negative electrode tank 107 are examples of ion species contained in the electrode electrolytes. In FIG. 7 solid line arrows indicate charging, and dashed line arrows indicate discharging.

[Basic Structure]
(Overall Structure)

The RF battery system 1 includes an RF battery and a circulation mechanism that circulates and supplies electrolytes to the RF battery. The RF battery is connected, typically, through an alternating current/direct current converter 200, transforming equipment 210, and the like, to a power generation unit 300 and a load 400 such as an electric power system or consumer, performs charging using the power generation unit 300 as an electric power supply source, and performs discharging to the load 400 as an electric power supply target. Examples of the power generation unit 300 include a photovoltaic power generation apparatus, a wind power generation apparatus, and a general power plant.

The RF battery includes, as a major constituent member, a battery cell 100 which includes a positive electrode cell 102 containing a positive electrode 104, a negative electrode cell 103 containing a negative electrode 105, and a membrane 101 which is interposed between the positive electrode 104 and the negative electrode 105 to separate the positive electrode cell 102 and the negative electrode cell 103 and through which predetermined ions permeate. The circulation mechanism includes a positive electrode tank 106 that stores a positive electrode electrolyte to be circulated and supplied to the positive electrode 104, a negative electrode tank 107 that stores a negative electrode electrolyte to be circulated and supplied to the negative electrode 105, pipes 108 and 110 that connect between the positive electrode tank 106 and the battery cell 100, pipes 109 and 111 that connect between the negative electrode tank 107 and the battery cell 100, and pumps 112 and 113 provided on the upstream side (supply side) pipes 108 and 109.

In the RF battery system 1, a circulating pathway of the positive electrode electrolyte is formed, in which the positive electrode electrolyte is supplied from the positive electrode tank 106 via the upstream side pipe 108 to the positive electrode cell 102, and the positive electrode electrolyte is returned from the positive electrode cell 102 via the downstream side (discharge side) pipe 110 to the positive electrode tank 106.

Furthermore, in the RF battery system 1, a circulating pathway of the negative electrode electrolyte is formed, in which the negative electrode electrolyte is supplied from the negative electrode tank 107 via the upstream side pipe 109 to the negative electrode cell 103, and the negative electrode electrolyte is returned from the negative electrode cell 103 via the downstream side (discharge side) pipe 111 to the negative electrode tank 107.

In the RF battery system 1, by using the circulating pathway of the positive electrode electrolyte and the circulating pathway of the negative electrode electrolyte, while circulating and supplying the positive electrode electrolyte to the positive electrode cell 102 and circulating and supplying the negative electrode electrolyte to the negative electrode cell 103, charging and discharging are performed in response to valence-change reactions of metal ions serving as an active material in each electrode electrolyte.

The RF battery is typically used in the form of a cell stack including a plurality of battery cells 100. A battery cell 100 is typically formed using a cell frame including a bipolar plate (not shown) having a positive electrode 104 disposed on one surface thereof and a negative electrode 105 disposed on the other surface thereof, and a frame (not shown) which is formed on the outer periphery of the bipolar plate. The frame has liquid supply holes for supplying the electrolytes and liquid drainage holes for discharging the electrolytes. By stacking a plurality of cell frames, the liquid supply holes and the liquid drainage holes constitute flow paths for the electrolytes, and the pipes 108 to 111 are connected to the flow paths. The cell stack is formed by repeatedly stacking a cell frame, a positive electrode 104, a membrane 101, a negative electrode 105, a cell frame, and so on in this order. A known structure can be appropriately used as the basic structure of the RF battery system 1.

In the RF battery systems 1A to 1D according to Embodiments 1 to 4 which will be described below, the positive electrode electrolyte contains manganese ions, and the negative electrode electrolyte contains specific negative electrode metal ions. In particular, in the RF battery systems 1A to 1D according to Embodiments 1 to 4, one of the characteristics is that the positive electrode electrolyte contains specific added metal ions.

(Electrolyte)
Positive Electrode Electrolyte
Manganese Ions

The positive electrode electrolyte provided in the RF battery systems 1A to 1D according to Embodiments 1 to 4 contains manganese ions as a positive electrode active material. Manganese ions can have various valences. Typically, the positive electrode electrolyte contains at least one of divalent manganese ions ($Mn^{2+}$) and trivalent manganese ions ($Mn^{3+}$, charged Mn ions). Furthermore, the positive electrode electrolyte may contain tetravalent manganese ions in some cases. Tetravalent manganese ions are considered to be $MnO_2$. However, this $MnO_2$ does not exist as solid precipitates, but exists in a stable state such that they are dissolved in the electrolyte. There may be a case where, during discharging, $Mn^{2+}$ given by the two-electron reaction ($Mn^{4+}+2e^-\rightarrow Mn^{2+}$) can be repeatedly used as a positive electrode active material, thus contributing to an increase in battery capacity. That is, tetravalent manganese ions can be considered to be a positive electrode active material, and are treated as being different from manganese dioxide existing as solid precipitates. Regarding the content of tetravalent manganese ions in the positive electrode electrolyte, a certain amount, for example, about 10% or less relative to the total amount (mol) of manganese ions, is permissible.

The concentration of manganese ions (hereinafter, may be referred to as the "Mn concentration") in the positive electrode electrolyte is, for example, 0.3 to 5 M. When the Mn concentration is 0.3 M or more, an energy density (e.g., about 10 kWh/m$^3$) sufficient for a large-capacity storage battery can be achieved. As the Mn concentration increases, the energy density can be increased and, therefore, the Mn concentration can be set to be 0.5 M or more, or further to be 1.0 M or more, 1.2 M or more, or 1.5 M or more. In the RF battery systems 1A to 1D according to Embodiments 1 to 4, since the positive electrode electrolyte contains the specific added metal ions, even when the Mn concentration is increased, precipitation of precipitates, such as manganese dioxide, can be satisfactorily suppressed, and manganese ions can be made to be present stably. In the case where the positive electrode electrolyte further contains titanium ions, even when the Mn concentration is increased, precipitation of manganese dioxide can be sufficiently suppressed, which is preferable. In consideration of solubility in a solvent, the Mn concentration that is easy to use is 5 M or less, or further 2 M or less, which leads to excellent electrolyte manufacturability. The concentration of various species of metal ions contained in the electrode electrolytes can be measured, for example, by using inductively-coupled plasma emission spectrometry or inductively-coupled plasma mass spectrometry.

Added Metal Ions

The positive electrode electrolyte provided in the RF battery systems 1A to 1D according to Embodiments 1 to 4 contains ions which are effective in suppressing precipitation of manganese dioxide formed by precipitation of the major positive electrode active material. The precipitation-suppressing ions are at least one species of metal ions selected from the group consisting of cadmium ions, tin ions, antimony ions, lead ions, and bismuth ions. Each species of metal ions enumerated as the added metal ions can have various valences as exemplified below. However, each species of metal ions enumerated as the added metal ions can have other valences. The added metal ions with at least one valence are present in the positive electrode electrolyte. The positive electrode electrolyte may contain ions of the same element having different valences in some cases. These elements are allowed to be present as solid metal in addition to ions in the positive electrode electrolyte. For example, during the operation of recovering the added metal ions into the positive electrode electrolyte, the positive electrode electrolyte can contain metal precipitates formed by reduction of the added metal ions, i.e., at least one solid metal selected from the group consisting of cadmium, tin, antimony, lead, bismuth.

(a) Cadmium ions: divalent cadmium ions
(b) Tin ions: divalent tin ions, tetravalent tin ions
(c) Antimony ions: trivalent antimony ions, pentavalent antimony ions
(d) Lead ions: divalent lead ions, tetravalent lead ions
(e) Bismuth ions: trivalent bismuth ions, pentavalent bismuth ions The metal ions enumerated as the added metal ions, even in minute amounts, are effective in suppressing precipitation of precipitates such as manganese dioxide ($MnO_2$). Since the amount of the added metal ions can be minute, it is easy to suppress a decrease in the proportion of the positive electrode active material due to incorporation of the added metal ions in the positive electrode electrolyte. That is, the metal ions enumerated as the added metal ions easily increase the proportion of the positive electrode active material in the positive electrode electrolyte, and is expected to easily increase the energy density as a large-capacity storage battery. Although it is considered that the enumerated metal ions mainly function as a manganese dioxide precipitation inhibitor and do not substantially function as a positive electrode active material, the metal ions may function as an active material in some cases depending on the ion species (e.g., lead ions and the like). In the case where the added metal ions also function as a positive electrode active material, the energy density can be further increased as a large-capacity storage battery. Among the metal ions enumerated as the added metal ions, either a single species of added metal ions or a plurality of species of added metal ions can be incorporated and used.

The concentration of the added metal ions in the positive electrode electrolyte (total concentration in the case where a plurality of species of added metal ions are incorporated) is, for example, 0.001 to 1 M. When the concentration of the added metal ions in the positive electrode electrolyte is 0.001 M or more, it is possible to effectively suppress generation of precipitates such as manganese dioxide ($MnO_2$). As the concentration of the added metal ions in the positive electrode electrolyte increases, the effect of suppressing manganese dioxide is expected to increase and, therefore, the concentration can be set to be 0.005 M or more, or further 0.01 M or more. When the concentration of the added metal ions is excessively high, the proportion of the positive electrode active material in the positive electrode electrolyte decreases, resulting in a decrease in the energy density as a large-capacity storage battery. Therefore, the concentration of the added metal ions is preferably 0.8 M or less and more preferably 0.5 M or less.

The concentration of the added metal ions in the positive electrode electrolyte preferably satisfies the range described above not only before operation, i.e., in the unused state, but also at any time during use. The added metal ions in the positive electrode electrolyte can be mixed into the negative electrode electrolyte owing to electrolyte crossover over time or the like. Furthermore, the added metal ions in the positive electrode electrolyte can be present in the form of metal precipitates at any position in the circulating pathway of the negative electrode electrolyte, for example, on the negative electrode 105, inside the negative electrode tank 107, and inside the pipes 109 and 111. That is, the concentration of the added metal ions in the positive electrode electrolyte changes over time and, typically, tends to decrease over time. In the RF battery systems 1A to 1D according to Embodiments 1 to 4, by carrying out the method of operating an RF battery according to Embodiments 1 to 4 at the appropriate time and performing an operation of recovering the added metal ions into the positive electrode electrolyte, the added metal ions which have moved from the positive electrode electrolyte to the negative electrode electrolyte can be returned to the positive electrode electrolyte. Consequently, the liquid composition before operation and at the beginning of the operation can be substantially maintained. In particular, when the concentration of the added metal ions in the positive electrode electrolyte before operation is adjusted so as to satisfy the specific range described above, although varying over time, by performing the recovery operation appropriately, the concentration can satisfy the specific range described above over a long period of time, before operation to after operation. That is, upon carrying out the method of operating an RF battery according to Embodiments 1 to 4, the concentration of the added metal ions in the positive electrode electrolyte can be used as an indicator of whether or not the recovery operation is required and as an indicator of finishing the operation.

Titanium Ions

The positive electrode electrolyte provided in the RF battery systems 1A to 1D according to Embodiments 1 to 4 can further contain titanium ions. Titanium ions in the positive electrode electrolyte function as a manganese dioxide precipitation inhibitor and do not substantially function as a positive electrode active material. Titanium ions in the positive electrode electrolyte exist as at least one of tetravalent titanium ions (mainly $Ti^{4+}$) and trivalent titanium ions. Tetravalent titanium ions include $TiO^{2+}$ and the like. The concentration of titanium ions (hereinafter, may be referred to as the "Ti concentration") in the positive electrode electrolyte is, for example, 5 M or less (excluding 0). When the Ti concentration in the positive electrode electrolyte is 5 M or less, preferably 2 M or less, for example, dissolution can be satisfactorily performed even in the case where the electrolyte is an acid aqueous solution, and excellent electrolyte manufacturability is exhibited. A Ti concentration in the positive electrode electrolyte of about 0.3 to 2 M, or further about 0.5 to 1.5 M, is thought to be easy to use. Either an embodiment in which the Mn concentration is equal to the Ti concentration or an embodiment in which the Mn concentration is different from the Ti concentration can be used. As will be described later, in the case where the negative electrode electrolyte contains titanium ions, the Ti concentration in the positive electrode electrolyte can be set to be 0.3 M or more, 0.5 M or more, or further 1 M or more correspondingly to the concentration of titanium ions in the negative electrode electrolyte.

Negative Electrode Electrolyte

The negative electrode electrolyte provided in the RF battery systems 1A to 1D according to Embodiments 1 to 4 contains, as a negative electrode active material, at least one species of metal ions (negative electrode metal ions) selected from the group consisting of titanium ions, vanadium ions, and chromium ions. Each species of negative electrode metal ions can be combined with manganese ions serving as the positive electrode active material to form a redox couple having a high electromotive force. Each species of negative electrode metal ions can have various valences as exemplified below. The negative electrode metal ions with at least one valence are present in the negative electrode electrolyte. The negative electrode electrolyte may contain ions of the same element having different valences in some cases. These elements are allowed to be present as solid metal in addition to ions in the negative electrode electrolyte. Among the metal ions enumerated as the negative electrode metal ions, either a single species of negative electrode metal ions or a plurality of species of negative electrode metal ions can be incorporated into the negative electrode electrolyte and used.

(x) Titanium ions: trivalent titanium ions, tetravalent titanium ions
(y) Vanadium ions: divalent vanadium ions, trivalent vanadium ions
(z) Chromium ions: divalent chromium ions, trivalent chromium ions In particular, when a Mn—Ti-based RF battery which contains titanium ions as the negative electrode active material is constructed, the following advantages are exhibited: (i) an electromotive force of about 1.4 V can be obtained, and (ii) when titanium ions have moved from the negative electrode electrolyte to the positive electrode electrolyte over time, the titanium ions can function as a manganese dioxide precipitation inhibitor in the positive electrode electrolyte.

In the case where the negative electrode electrolyte contains a plurality of species of negative electrode metal ions, by selecting a combination in consideration of the standard redox potential of the negative electrode metal ions, that is, by combining metal ions having a higher potential with metal ions having a lower potential, the utilization rate of the negative electrode metal ions in the negative electrode electrolyte can be increased, thus contributing to improvement in the energy density as a large-capacity storage battery. For example, the negative electrode electrolyte may contain titanium ions and vanadium ions.

The concentration of negative electrode metal ions in the negative electrode electrolyte (total concentration in the case where a plurality of species of negative electrode metal ions are incorporated) is, for example, 0.3 to 5 M. When the concentration of negative electrode metal ions in the negative electrode electrolyte is 0.3 M or more, an energy density (e.g., about 10 $kWh/m^3$) sufficient for a large-capacity storage battery can be achieved. As the concentration of negative electrode metal ions in the negative electrode electrolyte increases, the energy density can be increased and, therefore, the concentration can be set to be 0.5 M or more, or further to be 1.0 M or more, 1.2 M or more, or 1.5 M or more. In consideration of solubility in a solvent, the concentration of negative electrode metal ions in the negative electrode electrolyte that is easy to use is 5 M or less, or further 2 M or less, which leads to excellent electrolyte manufacturability.

The negative electrode electrolyte is allowed to contain the added metal ions which have moved from the positive electrode electrolyte and metal precipitates formed by reduction of the added metal ions. Preferably, inclusion of the added metal ions and metal precipitates in the negative electrode electrolyte is temporary. In the RF battery systems 1A to 1D according to Embodiments 1 to 4, by carrying out the method of operating an RF battery according to Embodiments 1 to 4 at the appropriate time and performing an operation of recovering the added metal ions into the positive electrode electrolyte, the effect of addition of the added metal ions in the positive electrode electrolyte, i.e. the effect of suppressing precipitation of manganese dioxide can be sufficiently obtained. By performing the recovery operation, inclusion of the added metal ions and metal precipitates in the negative electrode electrolyte can be made substantially temporary.

In order to sufficiently obtain the effect of suppressing precipitation of manganese dioxide, preferably, the positive electrode electrolyte contains manganese ions, titanium ions, and added metal ions, and the negative electrode electrolyte contains titanium ions. Furthermore, when the positive electrode electrolyte and the negative electrode electrolyte both contain manganese ions and titanium ions, the following advantages are exhibited: (i) it is easy to avoid a decrease in battery capacity due to the decrease of the active material over time, (ii) it is easy to correct variations in the volume of electrolytes of the two electrodes, (iii) it is easy to prevent a change in the concentration due to movement of manganese ions and titanium ions to the counter electrode, and (iv) it is easy to manufacture electrolytes.

Regarding the concentration of manganese ions and the concentration of titanium ions in the two electrode electrolytes, either an embodiment in which the concentrations are different in the two electrodes or an embodiment in which the concentrations are same in the two electrodes can be used. Regarding the valence of manganese ions and the valence of titanium ions in the two electrode electrolytes, either an embodiment in which the valences are different in the two electrodes or an embodiment in which the valences are same in the two electrodes can be used. Either an embodiment in which the concentration of manganese ions is equal to the concentration of titanium ions in the negative electrode electrolyte or an embodiment in which the concentration of manganese ions is different from the concentration of titanium ions in the negative electrode electrolyte can be used. When the concentration and the valence of manganese ions in the electrolyte are same in the two electrodes, and the concentration and the valence of titanium ions in the electrolyte are same in the two electrodes, excellent electrolyte manufacturability is exhibited.

Solvent and Others in Electrolyte

Metal ions contained in the electrode electrolytes are all water-soluble ions. Therefore, an aqueous solution whose solvent is water can be suitably used for each of the positive electrode electrolyte and the negative electrode electrolyte. In particular, when an electrolyte is prepared by using sulfuric acid or a sulfate as a starting material to obtain an aqueous solution containing sulfuric acid, the following advantages are expected: (i) improvement in stability of various species of metal ions, improvement in reactivity of metal ions serving as an active material, and improvement in solubility may be achieved; (ii) a side reaction is unlikely to occur (electrolysis of water is unlikely to occur) even in the case where metal ions having a high potential such as manganese ions are used; (iii) because of high ionic conductance, the internal resistance of the battery is decreased; (iv) unlike the case where hydrochloric acid is used, chlorine gas is not generated; and (v) the electrolyte can be easily obtained by using a sulfate or the like and water, and thus excellent manufacturability is exhibited. The acid aqueous solution (electrolyte) prepared by using sulfuric acid or a sulfate typically includes sulfuric acid ($H_2SO_4$), sulfonic acid ($R-SO_3H$, R is a substituent), and the like. In the case where the electrolyte is an acid solution, when the acid concentration is increased, it is possible to suppress generation of precipitates, such as manganese dioxide, to a certain extent. As the electrolyte, an aqueous solution prepared by using a known acid (e.g., phosphoric acid) or a known salt (e.g., a phosphate), other than sulfuric acid or a sulfate, can be used.

(Materials of Other Constituent Members and Others)

Electrode

Examples of the material of the positive electrode 104 and the negative electrode 105 include materials containing mainly carbon fibers, such as non-woven fabric (carbon felt) and paper. The use of an electrode made of carbon felt provides advantages such as (i) being unlikely to generate oxygen gas even at an oxygen generation potential during charging in the case where an aqueous solution is used as an electrolyte, (ii) a large surface area, and (iii) excellent circulation of electrolyte. As the electrodes, known electrodes can be used.

Membrane

As the membrane 101, for example, an ion-exchange membrane, such as a cation-exchange membrane or anion-exchange membrane, may be used. The ion exchange membrane has advantages such as (i) excellent separation between ions of the positive electrode active material and ions of the negative electrode active material, and (ii) excellent permeability of $H^+$ ions serving as a charge carrier in the battery cell 100, and can be suitably used for the membrane 101. As the membrane, a known membrane can be used.

Embodiment 1

With reference to FIG. 1, an RF battery system 1A according to Embodiment 1 and a method of operating an RF battery by using the RF battery system 1A will be described.

The basic structure and the composition of electrolytes used of the RF battery system 1A are the same as those of the RF battery system 1 described above (also refer to FIG. 7). The RF battery system 1A is characterized by including, in addition to the basic structure of the RF battery system 1, a detecting portion 40 that detects the existence of metal precipitates 99 formed by reduction of the added metal ions which have moved from the positive electrode electrolyte to a circulating pathway of the negative electrode electrolyte, a branching introducing pipe 10 that supplies the positive electrode electrolyte in the positive electrode tank 106 from the positive electrode tank 106 to the negative electrode 105, and a branching return pipe 12 that returns the solution which has passed through the negative electrode 105 to the positive electrode tank 106. Characteristic points will be described in detail below, and a detailed description will be omitted about other constituent members, the composition of electrolytes, and the like.

RF Battery System

Detecting Portion

As the detecting portion 40, an appropriate one capable of recognizing the state in which the added metal ions which have mixed in a circulating pathway of the negative electrode electrolyte owing to electrolyte crossover or the like exist as metal precipitates 99 can be used. The RF battery system 1A (1A to 1D) may include at least one detecting portion among the detecting portions described below.

For example, as the detecting portion 40, an SOC measuring unit capable of measuring the SOC of the positive electrode electrolyte and the SOC of the negative electrode electrolyte may be used. In order to measure the SOC, for example, a method may be used in which the potential of the electrolyte, the absorption wavelength or absorbance of each ion in the electrolyte, or the like is measured, and the measurement data are converted into the SOC. Consequently, an SOC measuring unit including a measuring device capable of measuring the potential, absorption wavelength, or the like can be used. For example, an RF battery system may include an SOC measuring unit 41 installed on the pipe 108 or pipe 110, through which the positive electrode electrolyte is circulated, for measuring the potential of the positive electrode electrolyte and an SOC measuring unit 42 installed on the pipe 109 or pipe 111, through which the negative electrode electrolyte is circulated, for measuring the potential of the negative electrode electrolyte. FIG. 1, and FIGS. 2 to 5 which will be described later, imaginarily shows the state in which the SOC measuring units 41 and 42 are installed on the downstream side pipes 110 and 111, respectively. The correspondence between the redox potential and the SOC in the electrolyte is, for example, based on the Nernst equation. The potential of each electrode electrolyte is checked, and by using the redox potential of each electrode electrolyte relative to the reference electrode or by using the open-circuit voltage between the positive electrode and the negative electrode, the measured potential is converted into the SOC. In such a manner, the operator can easily know the SOC of each electrode electrolyte. When a device provided with a mechanism that automatically converts the potential of the electrolyte into the SOC is used as each of the SOC measuring units 41 and 42, the operator can more accurately know the SOC. In the case where a device that measures the absorption wavelength or absorbance of each ion by spectrometry is used as each of the SOC measuring units 41 and 42, a calibration curve is plotted using the differences in the absorption wavelength or absorbance among the ions, and with reference to the calibration curve, the measured absorption wavelength or the like is converted into the SOC. In such a manner, the operator can easily know the SOC of each electrode electrolyte. In the case where the SOC of the negative electrode electrolyte is lower than that of the positive electrode electrolyte, i.e., in the case where the difference between the SOC of the positive electrode electrolyte and the SOC of the negative electrode electrolyte is large, the operator can determine that a large amount of metal precipitates can exist. When a device provided with a mechanism that automatically measures the difference in the SOC and is capable of determining that the difference is equal to or more than the set threshold value is used, the operator can more easily know that a large amount of metal precipitates exists.

Alternatively, as the detecting portion 40, a flow meter 44 provided in the circulating pathway of the negative electrode electrolyte may be used. The flow meter 44 is installed on the pipe 109 or pipe 111, through which the negative electrode electrolyte is circulated, for measuring the flow rate of the negative electrode electrolyte. FIG. 1, and FIGS. 2 to 5 which will be described later, imaginarily shows the state in which the flow meter 44 is installed on the downstream side pipe 111. In the case where the flow rate of the negative electrode electrolyte is lower than the set value, it can be determined that mixing of metal precipitates makes flow difficult or because of clogging of the negative electrode 105 with metal precipitates 99, a sufficient amount of the solution does not flow through the pipe 111. That is, it can be determined that a large amount of metal precipitates can exist. When a mechanism that can determine that the flow rate is equal to or lower than the set threshold value, in addition to the flow meter 44, is provided, the operator can more easily know that a large amount of metal precipitates exists.

Alternatively, the detecting portion 40 may be a transparent window 46 provided in the circulating pathway of the negative electrode electrolyte. Specifically, the transparent window 46 may be installed on the pipe 109 or pipe 111, through which the negative electrode electrolyte is circulated, so that the negative electrode electrolyte inside the pipe 109 or pipe 111 can be visually checked. FIG. 1, and FIGS. 2 to 5 which will be described later, imaginarily shows the state in which the transparent window 46 is installed on the downstream side pipe 111. By directly visually checking the presence or absence of metal precipitates in the negative electrode electrolyte through the transparent window 46, the operator can easily determine the presence or absence and the amount of metal precipitates. In view of such a use, the transparent window 46 is preferably made of a material having transparency to such a degree that the inside of the pipe 109 or 111 can be visually checked and having resistance to the negative electrode electrolyte, for example, transparent rigid vinyl chloride.

As the detecting portion 40, when a mechanism that can measure the degree of transparency, in addition to the transparent window 46, is provided, the operator can more accurately know the amount of metal precipitates. When metal precipitates are precipitated and adhere to the transparent window 46, the degree of transparency of the transparent window 46 is decreased. Therefore, by measuring the degree of transparency, it is possible to know the degree of adhesion of metal precipitates, i.e., the amount of metal precipitates. The degree of transparency can be measured, for example, by using a transmittance measuring instrument in which the transparent window 46 is irradiated with light, and the transmittance of the light is measured. In this case, in order to allow irradiation of light, the transparent window 46 is provided such that transparent areas are located at opposing positions in the radial direction of the pipe 111 or the like. For example, part of the pipe 111 may be made to be a transparent pipe. When a mechanism that can determine that the transmittance is equal to or lower than the set threshold value, in addition to the transmittance measuring instrument, is provided, the operator can more easily know that a large amount of metal precipitates exists.

As another detecting portion 40, a concentration measuring unit that measures the concentration of the added metal ions in the positive electrode electrolyte may be used. The concentration measuring unit may be an electrolyte extracting unit, in which the extracted electrolyte is analyzed by inductively-coupled plasma emission spectrometry, inductively-coupled plasma mass spectrometry, or the like. When a mechanism that can determine that the measured concentration is equal to or less than the set threshold value is further provided, the operator can more easily know that a large amount of metal precipitates exists. As another detecting portion 40, a valence measuring unit that measures the valence of the negative electrode metal ions of the negative electrode electrolyte may be used. The valence measuring unit may be an electrolyte extracting unit, in which the extracted electrolyte is analyzed by coulometry or the like. For example, at the end of charging, the amount of charged ions of the negative electrode is considered to be large, and if a large number of measured valences corresponds to discharged ions of the negative electrode, the operator can determine that there are many metal precipitates in the negative electrode electrolyte. When a mechanism that can determine that the measured amount of discharged ions of the negative electrode is equal to or less than the set threshold value is further provided, the operator can more easily know that a large amount of metal precipitates exists.

As the mechanism that can determine the magnitude relative to the threshold value, for example, a computer or the like can be used. A computer or the like may be used as a control unit of the RF battery system 1A. The control unit may include an existence determination unit that determines whether or not the existence of metal precipitates is equal to or larger than the set threshold value, and a recovery instruction unit that instructs execution and stop of the operation of recovering the added metal ions into the positive electrode electrolyte on the basis of the determination result. In the case where the SOC measuring units 41 and 42 and the like are used as the detecting portion 40, the existence determination unit may be an SOC determination unit that determines on the basis of comparison between the measured SOC and the threshold value. In the case where the flow meter 44, the transparency measuring device, the concentration measuring unit, the valence measuring unit, or the like is used as the detecting portion 40, the flow rate, the degree of transparency, the concentration, the valence, or the like is used as the measurement data, and the existence determination unit that determines on the basis of comparison between the measurement data and the threshold value may be a flow rate determination unit, a transparency determination unit, a concentration determination unit, a valence determination unit, or the like. The recovery instruction unit may instruct opening or closing of valves 20, 22, 30, and 32, which will be described later.

Branching Introducing Pipe/Branching Return Pipe

The example shown in FIG. 1 includes a branching introducing pipe 10 whose one end is connected to the upstream side pipe 108 of the positive electrode on the downstream side of the pump 112 and whose other end is connected to the upstream side pipe 109 of the negative electrode, and a branching return pipe 12 whose one end is connected to the downstream side pipe 110 of the positive electrode and whose other end is connected to the downstream side pipe 111 of the negative electrode. The branching introducing pipe 10 and the branching return pipe 12 may have the same constituent material, size (inside diameter or the like), and thickness as those of the pipes 108 to 111. Typical examples of the constituent material of the branching introducing pipe 10, the branching return pipe 12, and the pipes 108 to 111 include a resin, such as vinyl chloride, polyethylene, polypropylene, or polytetrafluoroethylene. The opening positions of the branching introducing pipe 10 and the branching return pipe 12, i.e., connecting positions with the pipes 108 to 111 can be appropriately selected, and those shown in FIG. 1 are merely illustrative.

The valves 20 and 22 are provided on the branching introducing pipe 10 and the branching return pipe 12, respectively. The valves 20 and 22 are opened when the positive electrode electrolyte is circulated to the negative electrode 105 (op, refer to the diagram on the right of FIG. 1), and are closed at other times (cl, refer to the diagram on the left of FIG. 1). The valves 30 and 32 are provided on the upstream side pipe 109 of the negative electrode and the downstream side pipe 111 of the negative electrode, respectively. The valves 30 and 32 are closed when the positive electrode electrolyte is circulated through the branching introducing pipe 10 and the branching return pipe 12 (cl, refer to the diagram on the right of FIG. 1), and are opened when the negative electrode electrolyte is circulated for performing normal charging and discharging (op, refer to the diagram on the left of FIG. 1). The valve 30 is provided between the connecting point with the branching introducing pipe 10 in the upstream side pipe 109 of the negative electrode and the negative electrode tank 107. The valve 32 is provided on the downstream side of the connecting point with the branching return pipe 12 (near the negative electrode tank 107) in the downstream side pipe 111 of the negative electrode. Regarding the valves 20, 22, 30, and 32, and valves 24, 26 to 29, and 34 to 37, which will be described later, suitable valves used for opening and closing an electrolyte pipe may be used.

Method of Operating RF Battery

A description will be made on the procedure of a method of operating an RF battery according to Embodiment 1 in which the operation of recovering added metal ions into the positive electrode electrolyte is performed by using the RF battery system 1A according to Embodiment 1.

The RF battery system 1A is used, as in the existing RF battery system, for performing charging and discharging while circulating and supplying the positive electrode electrolyte and the negative electrode electrolyte. A standby period is generally provided between a charging operation and a discharging operation. Furthermore, in general, by continuously using the electrolytes prepared before operation, charging and discharging are repeatedly performed. The RF battery system 1A uses a positive electrode electrolyte containing manganese ions as a positive electrode active material and added metal ions which are effective in suppressing precipitation of manganese ions over time. As described above, by continuously using the same electrolytes, added metal ions move from the positive electrode electrolyte to the negative electrode electrolyte, and the added metal ions are further reduced by the negative electrode active material and the like and can be present as metal precipitates 99 in the negative electrode electrolyte. In the method of operating an RF battery according to Embodiment 1, the metal precipitates 99 are recovered as ions into the positive electrode electrolyte. This presupposition also applies to Embodiments 2 to 4 which will be described later. In FIG. 1, and FIGS. 2 to 5 which will be described later, negative electrode metal ions are exemplified by titanium ions ($Ti^{3+}$, $Ti^{4+}$), added metal ions are exemplified by bismuth ions ($Bi^{3+}$), and metal precipitates 99 are exemplified by bismuth (Bi).

Detection Step

Specifically, the existence of metal precipitates formed by reduction of the added metal ions in the circulating pathway of the negative electrode electrolyte is detected by a detecting portion 40. On the basis of information from the detecting portion 40, when it is determined that metal precipitates are contained in the circulating pathway of the negative electrode electrolyte and that it is better to perform a recovery operation into the positive electrode electrolyte, the dissolution step described below is performed during the standby period or the like.

Dissolution Step

As shown in the diagram on the left of FIG. 1, at the end of charging, it is thought that the added metal ions mixed in the circulating pathway of the negative electrode electrolyte are precipitated particularly on the negative electrode 105 in the circulating pathway of the negative electrode electrolyte, and can be present as metal precipitates 99. The reason for this is thought to be that since the state of charge (SOC) is increased by charging, the solubility of the metal precipitates 99 decreases in the negative electrode electrolyte, added metal ions are likely to be present as metal precipitates 99, and the vicinity of the negative electrode 105 easily receives electrons. Accordingly, in the method of operating an RF battery according to Embodiment 1, by supplying the positive electrode electrolyte at the end of charging to the negative electrode 105 on which metal precipitates 99 are precipitated and by returning the solution which has passed through the negative electrode 105 to the positive electrode tank 106, the added metal ions are recovered into the positive electrode electrolyte.

Specifically, as shown in the diagram on the right of FIG. 1, at the end of charging, the valves 30 and 32 of the pipes 109 and 111 on the negative electrode side are each closed (cl), and the valve 20 of the branching introducing pipe 10 and the valve 22 of the branching return pipe 12 are each opened (op). In this state, by driving the pump 112 on the positive electrode side, the positive electrode electrolyte is supplied via the upstream side pipe 108 of the positive electrode, the branching introducing pipe 10, and the upstream side pipe 109 of the negative electrode in this order to the negative electrode 105 of the battery cell 100. The positive electrode electrolyte which has passed through the negative electrode 105 is returned via the downstream side pipe 111 of the negative electrode, the branching return pipe 12, and the downstream side pipe 110 of the positive electrode in this order to the positive electrode tank 106. At this time, by using the pipes 108 and 110 on the positive electrode side, the positive electrode electrolyte can be supplied to the positive electrode 104.

The positive electrode electrolyte which has passed through the negative electrode 105, with metal precipitates 99 being contained, is swept away into the positive electrode tank 106. Since charged Mn ions ($Mn^{3+}$) that can reduce metal precipitates 99 are present in sufficient amounts in the positive electrode tank 106, the metal precipitates 99 introduced into the positive electrode tank 106 are reduced by charged Mn ion to form added metal ions. For example, in the case where the added metal ions are bismuth ions, the following redox reaction takes place.

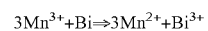
$3Mn^{3+}+Bi \Rightarrow 3Mn^{2+}+Bi^{3+}$

Alternatively, since the positive electrode electrolyte at the end of charging contains a sufficient amount of charged Mn ions as described above, in the pathway after the battery cell 100, the metal precipitates 99 are reduced by the charged Mn ions and introduced into the positive electrode tank 106.

In the method of operating an RF battery according to Embodiment 1, as described above, by dissolving and ionizing the metal precipitates 99 precipitated on the negative electrode 105 in the positive electrode electrolyte, the added metal ions can be recovered into the positive electrode electrolyte.

Furthermore, in the RF battery system 1A according to Embodiment 1, by sufficiently supplying the positive electrode electrolyte, for example, by repeating a plurality of times the circulating and supplying process, the metal precipitates 99 precipitated on the negative electrode 105 can be more reliably recovered. For example, during supplying the positive electrode electrolyte, by using the detecting portion 40 to check the existence of the metal precipitates 99, the positive electrode electrolyte can be supplied until substantially no metal precipitates 99 are present in the negative electrode electrolyte. Specifically, the positive electrode electrolyte can be supplied until the SOC of the positive electrode electrolyte becomes substantially equal to the SOC of the negative electrode electrolyte, or until the metal precipitates cannot be checked from the transparent window 46.

Furthermore, since the negative electrode electrolyte contains metal precipitates 99, the negative electrode electrolyte, at the end of charging, cannot sufficiently receive electrons, i.e., cannot sufficiently be charged, and can contain discharged ions of the negative electrode. Therefore, the SOC of the negative electrode electrolyte at the end of charging tends to be lower than the SOC of the positive electrode electrolyte at the end of charging. On the other hand, when the recovery operation of the metal precipitates is performed, the SOC decreases because the positive electrode electrolyte contains discharged manganese ions (hereinafter, may be referred to as "discharged Mn ions"). As a result, by performing the recovery operation of the metal precipitates, the SOC of the positive electrode electrolyte can be substantially equal to the SOC of the negative electrode electrolyte.

After the recovery operation of added metal ions is completed, in the RF battery system 1A according to Embodiment 1, the valve 20 of the branching introducing pipe 10 and the valve 22 of the branching return pipe 12 are each closed (cl). In the RF battery system 1A according to Embodiment 1, the valves 30 and 32 of the pipes 109 and 111 on the negative electrode side are each kept being closed, and may be opened (op) when charging and discharging are performed.

By performing the recovery operation of metal precipitates repeatedly at an appropriate interval during a standby period after charging or the like, the liquid composition before operation can be substantially maintained in the RF battery system 1A according to Embodiment 1. Regarding this point, the same applies to Embodiments 2 to 4 which will be described later.

Advantages

In the RF battery system 1A according to Embodiment 1, since the positive electrode electrolyte has a specific liquid composition containing manganese ions and added metal ions, it is possible to suppress precipitation of manganese dioxide due to the added metal ions. In particular, by carrying out the method of operating an RF battery according to Embodiment 1 by using the RF battery system 1A according to Embodiment 1, even in the case where added metal ions move from the positive electrode electrolyte to the negative electrode electrolyte over time, the amount of added metal ions in the positive electrode electrolyte is decreased, and the added metal ions can be present as metal precipitates in the negative electrode electrolyte, the RF battery system 1A according to Embodiment 1 can easily recover the added metal ions into the positive electrode electrolyte. Consequently, in the RF battery system 1A according to Embodiment 1, by carrying out the method of operating an RF battery according to Embodiment 1, the effect of suppressing precipitation of manganese dioxide due to incorporation of the added metal ions into the positive electrode electrolyte can be maintained over a long period of time.

Embodiment 2

Figure 2:
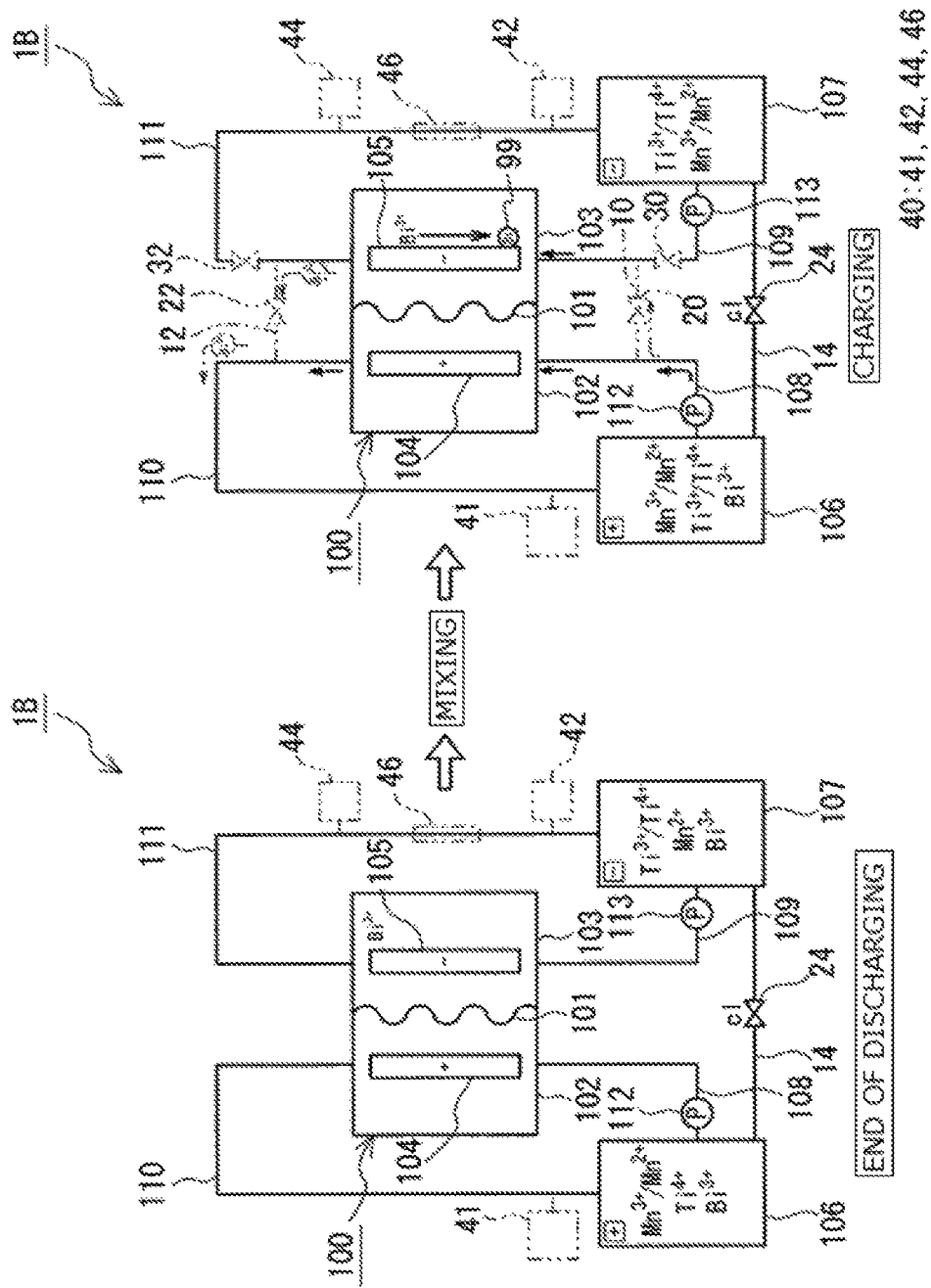
FIG. 2 is a diagram illustrating a procedure for carrying out a method of operating a redox flow battery according to Embodiment 2 by using a redox flow battery system according to Embodiment 2.

With reference to FIG. 2, an RF battery system 1B according to Embodiment 2 and a method of operating an RF battery by using the RF battery system 1B will be described.

The basic structure and the composition of electrolytes used of the RF battery system 1B are the same as those of the RF battery system 1 described above (also refer to FIG. 7). The RF battery system 1B is similar to the RF battery system 1A according to Embodiment 1 in that it includes a detecting portion 40, a branching introducing pipe 10, and a branching return pipe 12 (refer to the diagram on the right of FIG. 2). The RF battery system 1B is characterized by including a communicating pipe 14 that allows a positive electrode tank 106 and a negative electrode tank 107 to communicate with each other. Characteristic points will be described in detail below, and a detailed description will be omitted about other constituent members, the composition of electrolytes, and the like. In the diagram on the left of FIG. 2, in order to facilitate understanding, the branching introducing pipe 10 and the branching return pipe 12 are omitted.

RF Battery System

Communicating Pipe

In the example shown in FIG. 2, the RF battery system 1B includes a communicating pipe 14 whose one end is connected to the positive electrode tank 106 and whose other end is connected to the negative electrode tank 107, the communicating pipe 14 allowing the positive electrode tank 106 and the negative electrode tank 107 to communicate with each other. By allowing the positive electrode tank 106 and the negative electrode tank 107 to communicate with each other, the communicating pipe 14 enables mixing of the positive electrode electrolyte of the positive electrode tank 106 and the negative electrode electrolyte of the negative electrode tank 107 and is used for storing the mixed solution in the positive electrode tank 106 and the negative electrode tank 107. The same constituent material as that of the pipes 108 to 111 can be used for the communicating pipe 14. The size (inside diameter or the like) of the communicating pipe 14 may be appropriately selected. When the communicating pipe 14 is made larger (made thicker) than the pipe 108 and the like, mixing of the two electrode electrolytes can be performed rapidly. The opening positions of the communicating pipe 14, i.e., connecting positions with the positive electrode tank 106 and the negative electrode tank 107 can be appropriately selected. As shown in FIG. 2, in the RF battery system 1B, when the opening positions of the communicating pipe 14 are provided at the bottom of the positive electrode tank 106 and the negative electrode tank 107, all the solutions in the positive electrode tank 106 and the negative electrode tank 107 are easily mixed.

A valve 24 is provided on the communicating pipe 14. The valve 24 is opened when the two electrode electrolytes are mixed, and is closed at other times (cl). By providing the valve 24 on the communicating pipe 14, the two electrolytes can be mixed only when required, and the RF battery system 1B can reduce a loss due to mixing, for example, a loss due to self-discharge.

In addition, the RF battery system 1B may include a plurality of communicating pipes. For example, the RF battery system 1B may be configured to include two communicating pipes (not shown) described below. In one communicating pipe, one end thereof is connected to the positive electrode tank 106 (e.g., the bottom), and the other end thereof is connected to the negative electrode tank 107 (e.g., the top). In the other communicating pipe, one end thereof is connected to the negative electrode tank 107 (e.g., the bottom), and the other end thereof is connected to the positive electrode tank 106 (e.g., the top). When a plurality of communicating pipes are provided in such a manner, the electrolyte of one electrode can be efficiently introduced into the tank of another electrode, and the two electrolytes are easily mixed more rapidly. Regarding this point and a pump provided on the communicating pipe 14 of the RF battery system 1B which will be described later, the same applies to Embodiment 3 which will be described later.

In addition, a pump (not shown) can be provided on the communicating pipe 14 and the like. By using a pump, mixing of the two electrode electrolytes can be performed more rapidly. In the case where a pump is provided, the degree of freedom of the opening positions of the communicating pipe 14 and the like can be enhanced. Even when a pump is not provided, as described above, by ingeniously setting the opening positions of the communicating pipe 14, mixing can be satisfactorily performed by using the self-weight of the electrolytes and the like.

Branching Introducing Pipe/Branching Return Pipe

The RF battery system 1B according to Embodiment 2 also includes, as indicated by the two-dot chain lines in the diagram on the right of FIG. 2, a branching introducing pipe 10 whose one end is connected to the upstream side pipe 108 of the positive electrode and whose other end is connected to the upstream side pipe 109 of the negative electrode, and a branching return pipe 12 whose one end is connected to the downstream side pipe 110 of the positive electrode and whose other end is connected to the downstream side pipe 111 of the negative electrode. Furthermore, valves 20 and 22 are provided on the branching introducing pipe 10 and the branching return pipe 12, respectively. In the RF battery system 1B according to Embodiment 2, the valves 20 and 22 of the branching introducing pipe 10 and the branching return pipe 12 are opened when the mixed solution formed by mixing the two electrode electrolytes using the communicating pipe 14 is stored in the positive electrode tank 106 and the negative electrode tank 107 and the mixed solution stored in the positive electrode tank 106 is supplied to the negative electrode 105, and are closed at other times. That is, the RF battery system 1B according to Embodiment 2 differs from Embodiment 1 in that the solution to be circulated through the branching introducing pipe 10 and the branching return pipe 12 is the mixed solution. In view of this, in the RF battery system 1B, an RF battery in which both the positive electrode electrolyte and the negative electrode electrolyte contain manganese ions and negative electrode metal ions can be suitably used. The diagram on the right of FIG. 2 and the diagram on the right of FIG. 3, which will be described later, each illustrate the case where the two electrode electrolytes contain manganese ions and titanium ions.

Furthermore, in the RF battery system 1B according to Embodiment 2, as in Embodiment 1, valves 30 and 32 are provided on the upstream side pipe 109 of the negative electrode and the downstream side pipe 111 of the negative electrode, respectively. The valves 30 and 32 are closed when the mixed solution in the positive electrode tank 106 is circulated through the branching introducing pipe 10 and the branching return pipe 12, and are opened when the negative electrode electrolyte is circulated for performing normal charging and discharging.

Method of Operating RF Battery

A description will be made on the procedure of a method of operating an RF battery according to Embodiment 2 in which the operation of recovering added metal ions into the positive electrode electrolyte is performed by using the RF battery system 1B according to Embodiment 2.

In the RF battery system 1B, as in the RF battery system 1A, a positive electrode electrolyte containing manganese ions and added metal ions is used, and the electrolytes prepared before operation are continuously used. Accordingly, the added metal ions move from the positive electrode electrolyte to the negative electrode electrolyte, and metal precipitates can be contained in the negative electrode electrolyte. In the method of operating an RF battery according to Embodiment 2, the metal precipitates are recovered as ions into the positive electrode electrolyte, and in particular, the method is characterized in that, before the dissolution step, the mixing step and the charging step described below are performed. The characteristic point will be described in detail below, and a detailed description will be omitted about the same points as those of Embodiment 1.

Detection Step

In the RF battery system 1B according to Embodiment 2, as in Embodiment 1, the existence of the metal precipitates in the circulating pathway of the negative electrode electrolyte is detected by a detecting portion 40. On the basis of information from the detecting portion 40, when it is determined that metal precipitates are contained in the circulating pathway of the negative electrode electrolyte and that it is better to perform a recovery operation into the positive electrode electrolyte, during the standby period or the like when the normal charging and discharging operation is not performed, after performing the mixing step and the charging step described below, the dissolution step is performed.

As shown in the diagram on the left of FIG. 2, in the RF battery system 1B according to Embodiment 2, it is thought that, at the end of discharging, the added metal ions which have mixed into the circulating pathway of the negative electrode electrolyte to form metal precipitates are oxidized and likely to be present in the form of ions. Furthermore, in the RF battery system 1B according to Embodiment 2, it is thought that since the solubility of the metal precipitates in the negative electrode electrolyte at the end of discharging is high, when the metal precipitates are oxidized and ionized by charged ions of the negative electrode, they are likely to be present as ions, i.e., the added metal ions are likely to be present. As a result, in the RF battery system 1B according to Embodiment 2, it is thought that the added metal ions are present in sufficient amounts inside the negative electrode cell 103, inside the negative electrode tank 107, and inside the pipes 109 and 111 on the negative electrode side. Accordingly, in the method of operating an RF battery according to Embodiment 2, first, by precipitating the added metal ions present in the circulating pathway of the negative electrode electrolyte on the negative electrode 105, the state in which metal precipitates 99 are reliably present on the negative electrode 105 is actively formed (refer to the diagram on the right of FIG. 2). Then, as described in Embodiment 1, by supplying the positive electrode electrolyte to the negative electrode 105 and returning the solution which has passed through the negative electrode 105 to the positive electrode tank 106, the added metal ions can be recovered into the positive electrode electrolyte.

Mixing Step

Specifically, in the method of operating an RF battery according to Embodiment 2, at the end of discharging, by opening the valve 24 of the communicating pipe 14, the positive electrode electrolyte in the positive electrode tank 106 and the negative electrode electrolyte in the negative electrode tank 107 are mixed, and the mixed solution is stored in the positive electrode tank 106 and the negative electrode tank 107. At this time, the added metal ions contained in the positive electrode electrolyte can be moved into the negative electrode tank 107. However, this is permitted because recovery is possible by the charging operation subsequently performed. In the method of operating an RF battery according to Embodiment 2, by mixing the two electrode electrolytes at the end of discharging, the added metal ions can be more reliably made to be present in the positive electrode tank 106 and the negative electrode tank 107. When sufficient mixing is achieved, the valve 24 of the communicating pipe 14 is closed (cl). By performing the mixing step, the mixed solution containing the added metal ions is stored in the positive electrode tank 106 and the negative electrode tank 107. Furthermore, by mixing the positive electrode electrolyte at the end of discharging and the negative electrode electrolyte at the end of discharging, it is likely to reduce a loss due to self-discharge. The detection of the existence of metal precipitates may be performed at the end of discharging, or normal discharging may be performed after the detention to cause the end of discharging.

Charging Step

In the method of operating an RF battery according to Embodiment 2, the mixed solution is charged with the valve 24 of the communicating pipe 14 being closed. In this step, the charge voltage can be set to be the same as the end-of-charge voltage in the normal charging operation, but can be adjusted such that added metal ions are precipitated. When the charging of the mixed solution is started, the charging potential is higher than the potential of the mixed solution formed by mixing the electrolytes at the end of discharging. Therefore, as shown in the diagram on the right of FIG. 2, the added metal ions contained in the mixed solution inside the negative electrode tank 107 receive electrons at the negative electrode 105 to become metal precipitates 99. That is, metal precipitates 99 are precipitated on the negative electrode 105. It is preferable to perform charging until substantially all of the amount of the added metal ions present in the circulating pathway of the negative electrode electrolyte are precipitated as metal precipitates 99 on the negative electrode 105.

As charging proceeds, the amount of charged ions of the negative electrode (e.g., $Ti^{4+}$) increases in the mixed solution inside the negative electrode tank 107. However, since the potential of the mixed solution is lower than the charging potential of the battery cell 100 as described above, the redox reaction of metal precipitates 99 with charged ions of the negative electrode are unlikely to occur, and the metal precipitates 99 can substantially remain in the state of adhering to the negative electrode 105. On the other hand, as charging proceeds, the amount of charged Mn ions increases in the mixed solution inside the positive electrode tank 106.

Dissolution Step

In the method of operating an RF battery according to Embodiment 2, after charging, in order to ionize the metal precipitates 99 adhering to the negative electrode 105 and to achieve recovery into the positive electrode electrolyte, the dissolution step is performed as in Embodiment 1. Specifically, the valves 30 and 32 of the pipes 109 and 111 on the negative electrode side are each closed, and the valve 20 of the branching introducing pipe 10 and the valve 22 of the branching return pipe 12 are each opened. In this state, by driving the pump 112 on the positive electrode side, the mixed solution in the positive electrode tank 106 is supplied via the upstream side pipe 108 of the positive electrode, the branching introducing pipe 10, and the upstream side pipe 109 of the negative electrode in this order to the negative electrode 105 in the battery cell 100. The mixed solution which has passed through the negative electrode 105 is returned via the downstream side pipe 111 of the negative electrode, the branching return pipe 12, and the downstream side pipe 110 of the positive electrode in this order to the positive electrode tank 106.

The mixed solution which has passed through the negative electrode 105, as in Embodiment 1, with metal precipitates 99 being contained, is swept away into the positive electrode tank 106 and dissolved and ionized inside the positive electrode tank 106, or is ionized in the pathway after the battery cell 100 and recovered as added metal ions to the positive electrode tank 106.

In the method of operating an RF battery according to Embodiment 2, as described above, by dissolving and ionizing the metal precipitates 99 precipitated on the negative electrode 105 in the positive electrode electrolyte, the added metal ions can be recovered into the positive electrode electrolyte. In the method of operating an RF battery according to Embodiment 2, while appropriately checking the existence of metal precipitates 99 by using the detecting portion 40, by repeating a plurality of times the circulation and supply of the mixed solution in the positive electrode tank 106, the metal precipitates 99 can be more reliably recovered.

After the recovery operation of added metal ions is completed, in the method of operating an RF battery according to Embodiment 2, the valve 20 of the branching introducing pipe 10 and the valve 22 of the branching return pipe 12 are each closed. The valves 30 and 32 of the pipes 109 and 111 on the negative electrode side and the valve 24 of the communicating pipe 14 are each kept being closed. When normal charging and discharging are performed, the valves 30 and 32 of the pipes 109 and 111 may be opened.

Advantages

In the RF battery system 1B according to Embodiment 2, as in Embodiment 1, since the positive electrode electrolyte has a specific liquid composition containing manganese ions and added metal ions, it is possible to suppress precipitation of manganese dioxide due to the added metal ions. Furthermore, by carrying out the method of operating an RF battery according to Embodiment 2, the added metal ions which have moved from the positive electrode electrolyte to the negative electrode electrolyte can be easily recovered into the positive electrode electrolyte. In particular, in the method of operating an RF battery according to Embodiment 2, after the added metal ions are more reliably made to be present in the positive electrode tank 106 and the negative electrode tank 107 (after the mixing step is performed), the metal precipitates 99 are collected on the negative electrode 105 and its vicinity (the charging step is performed). Furthermore, by carrying out the method of operating an RF battery according to Embodiment 2 by using the RF battery system 1B according to Embodiment 2, by precipitating the added metal ions contained in the circulating pathway of the negative electrode electrolyte on the negative electrode 105, metal precipitates 99 can be efficiently collected on the negative electrode 105 and its vicinity. As a result, the RF battery system 1B according to Embodiment 2 can efficiently recover the added metal ions into the positive electrode electrolyte. Consequently, in the RF battery system 1B according to Embodiment 2, by carrying out the method of operating an RF battery according to Embodiment 2, the effect of suppressing precipitation of manganese dioxide due to incorporation of the added metal ions into the positive electrode electrolyte can be maintained over a long period of time.

In the RF battery system 1B according to Embodiment 2, after the operation of recovering added metal ions into the positive electrode electrolyte has been performed, the electrolytes of the electrodes used for charging and discharging are each a mixed solution. That is, the positive electrode electrolyte contains manganese ions, negative electrode metal ions (e.g., titanium ions), and added metal ions, and the negative electrode electrolyte contains manganese ions and negative electrode metal ions (e.g., titanium ions). As described above, in the unused state, ions of the two electrode electrolytes may overlap each other. Regarding this point, the same applies to the RF battery system 1C according to Embodiment 3 in which mixing is performed.

Embodiment 3

Figure 3:
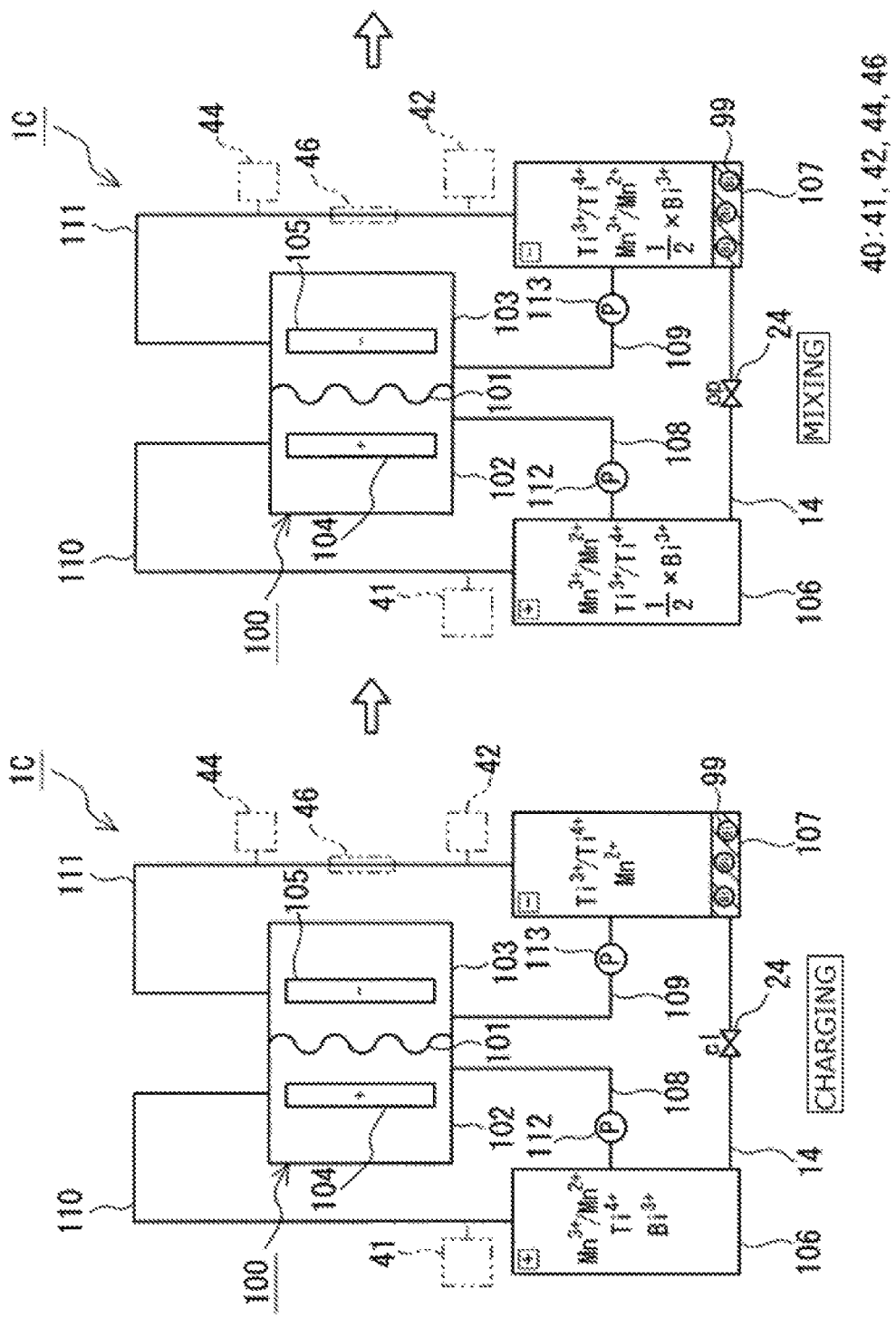
FIG. 3 is a diagram illustrating a procedure for carrying out a method of operating a redox flow battery according to Embodiment 3 by using a redox flow battery system according to Embodiment 3 and showing the procedure up to a mixing step.
Figure 4:
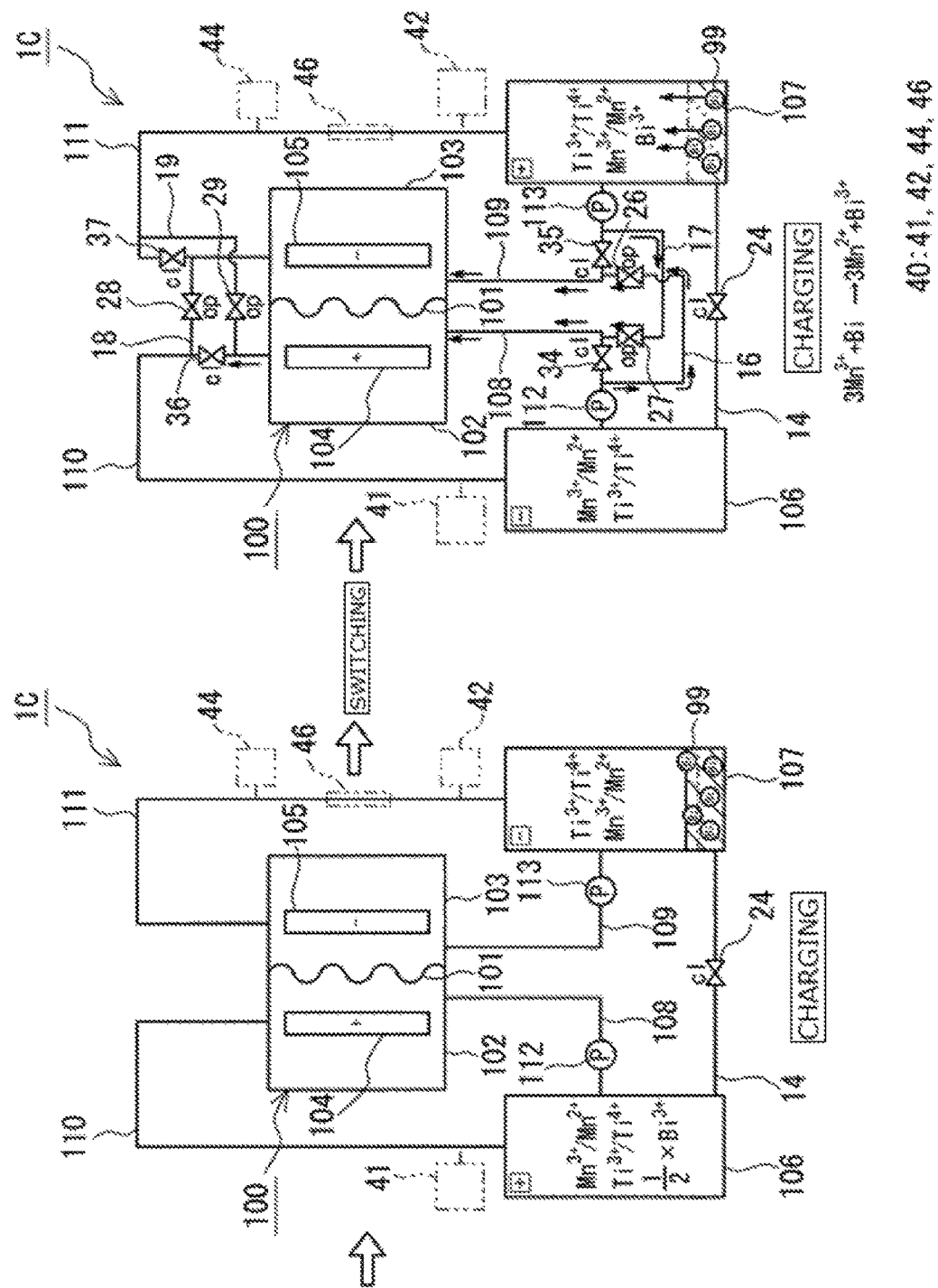
FIG. 4 is a diagram illustrating a procedure for carrying out the method of operating a redox flow battery according to Embodiment 3 by using the redox flow battery system according to Embodiment 3 and showing the procedure after a charging step.

With reference to FIGS. 3 and 4, an RF battery system 1C according to Embodiment 3 and a method of operating an RF battery by using the RF battery system 1C will be described.

The basic structure and the composition of electrolytes used of the RF battery system 1C are the same as those of the RF battery system 1 described above (also refer to FIG. 7). The RF battery system 1C is similar to the RF battery system 1B according to Embodiment 2 in that it includes a detecting portion 40 and a communicating pipe 14. The RF battery system 1C is characterized by including a branching introducing pipe 16 for negative electrode that supplies the solution in the positive electrode tank 106 to the negative electrode 105, a branching return pipe 18 for negative electrode that returns the solution which has passed through the negative electrode 105 to the positive electrode tank 106, a branching introducing pipe 17 for positive electrode that supplies the solution in the negative electrode tank 107 to the positive electrode 104, and a branching return pipe 19 for positive electrode that returns the solution which has passed through the positive electrode 104 to the negative electrode tank 107 (refer to the diagram on the right of FIG. 4). Characteristic points of the RF battery system 1C will be described in detail below, and a detailed description will be omitted about other constituent members, the composition of electrolytes, and the like. In FIG. 3 and the diagram on the left of FIG. 4, in order to facilitate understanding, the branching introducing pipes 16 and 17 and the branching return pipes 18 and 19 are omitted.

RF Battery System
Branching Introducing Pipe/Branching Return Pipe

In the example shown in the diagram on the right of FIG. 4, the RF battery system 1C includes a branching introducing pipe 16 on the negative electrode side and a branching introducing pipe 17 on the positive electrode side, each of whose one end is connected to the upstream side pipe 108 of the positive electrode on the downstream side of the pump 112 and each of whose other end is connected to the upstream side pipe 109 of the negative electrode on the downstream side of the pump 113, and a branching return pipe 18 on the negative electrode side and a branching return pipe 19 on the positive electrode side, each of whose one end is connected to the downstream side pipe 110 of the positive electrode and each of whose other end is connected to the downstream side pipe 111 of the negative electrode. The branching introducing pipes 16 and 17 and the branching return pipes 18 and 19 are provided with valves 26, 27, 28, and 29, respectively. Regarding the constituent material, size (inside diameter), thickness, opening positions (connecting positions), and the like of the branching introducing pipes 16 and 17 and the branching return pipes 18 and 19, reference can be made to the branching introducing pipe 10 and the branching return pipe 12 according to Embodiment 1.

Furthermore, in the RF battery system 1C, the pipes 108 to 111 are provided with valves 34, 35, 36, and 37, respectively. The valve 34 is provided on the upstream side pipe 108 of the positive electrode between the connecting points of the branching introducing pipes 16 and 17 of the two electrodes. The valve 35 is provided on the upstream side pipe 109 of the negative electrode between the connecting points of the branching introducing pipes 16 and 17 of the two electrodes. The valve 36 is provided on the downstream side pipe 110 of the positive electrode between the connecting points of the branching return pipes 18 and 19 of the two electrodes. The valve 37 is provided on the downstream side pipe 111 of the negative electrode between the connecting points of the branching return pipes 18 and 19 of the two electrodes.

The valves 26 to 29 provided on the branching introducing pipes 16 and 17 and the branching return pipes 18 and 19 and the valves 34 to 37 provided on the pipes 108 to 111 are opened and closed in the following manner. As shown in the diagram on the right of FIG. 4, both the positive electrode tank 106 and the negative electrode tank 107 store a mixed solution formed by mixing the two electrode electrolytes, and in the case where charging and discharging are performed with the mixed solution inside the positive electrode tank 106 being considered as the negative electrode electrolyte and with the mixed solution inside the negative electrode tank 107 being considered as the positive electrode electrolyte, the valves 26 to 29 provided on the branching introducing pipes 16 and 17 and the branching return pipes 18 and 19 are opened (op), and the valves 34 to 37 provided on the pipes 108 to 111 are closed (cl). Except for the case where charging and discharging are performed after switching between the positive electrode tank 106 and the negative electrode tank 107 as described above, the valves 26 to 29 provided on the branching introducing pipes 16 and 17 and the branching return pipes 18 and 19 are closed, the valves 34 to 37 provided on the pipes 108 to 111 are opened, and normal charging and discharging are performed with the solution inside the positive electrode tank 106 being considered as the positive electrode electrolyte and with the solution inside the negative electrode tank 107 being considered as the negative electrode electrolyte. The case where normal charging and discharging are performed corresponds to the state in which the branching introducing pipes 16 and 17, the branching return pipes 18 and 19, and the valves 26 to 29 and 34 to 37 are omitted as shown in the diagram on the right of FIG. 3.

Communicating Pipe

In the example shown in FIGS. 3 and 4, as in Embodiment 2, the RF battery system 1C includes a communicating pipe 14 whose one end is connected to the positive electrode tank 106 and whose other end is connected to the negative electrode tank 107, the communicating pipe 14 allowing the positive electrode tank 106 and the negative electrode tank 107 to communicate with each other. A valve 24 is provided on the communicating pipe 14. The valve 24 is opened (op, refer to the diagram on the right of FIG. 3) when the two electrode electrolytes are mixed, and is closed at other times (cl, refer to the diagram on the left of FIG. 3 and FIG. 4).

Method of Operating an RF Battery

A description will be made on the procedure of a method of operating an RF battery according to Embodiment 3 in which the operation of recovering added metal ions into the positive electrode electrolyte is performed by using the RF battery system 1C according to Embodiment 3.

In the RF battery system 1C, as in the RF battery system 1A according to Embodiment 1, a positive electrode electrolyte containing manganese ions and added metal ions is used, and the electrolytes prepared before operation are continuously used. Accordingly, the added metal ions move from the positive electrode electrolyte to the negative electrode electrolyte, and metal precipitates can be contained in the negative electrode electrolyte. In the method of operating an RF battery according to Embodiment 3, the metal precipitates are recovered as ions into the positive electrode electrolyte, and the method is similar to Embodiment 2 in that, before the dissolution step, the mixing step and the charging step described below are performed. In particular, the method of operating an RF battery according to Embodiment 3 is characterized in that, after the charging step, switching is performed such that the positive electrode tank 106 is changed to a negative electrode tank, and the negative electrode tank 107 is changed to a positive electrode tank, and then a subsequent charging and discharging operation is performed. The characteristic point will be described in detail below, and a detailed description will be omitted about the same points as those of Embodiments 1 and 2.

Detection Step

In the RF battery system 1C, as in Embodiments 1 and 2, the existence of the metal precipitates in the circulating pathway of the negative electrode electrolyte is detected by a detecting portion 40. On the basis of information from the detecting portion 40, when it is determined that metal precipitates are contained in the circulating pathway of the negative electrode electrolyte and that it is better to perform a recovery operation into the positive electrode electrolyte, during the standby period or the like when the normal charging and discharging operation is not performed, after performing the mixing step and the charging step described below, the dissolution step is performed.

As shown in the diagram on the left of FIG. 3, in the RF battery system 1C, in the state in which charging has been performed to a certain extent, for example, in the case where the state of charge (SOC) is 50% or more, many charged ions of the negative electrode (e.g., $Ti^{4+}$) are present in the negative electrode electrolyte and stored in the negative electrode tank 107. Accordingly, in the RF battery system 1C, when the added metal ions mixed in the circulating pathway of the negative electrode electrolyte are introduced into the negative electrode tank 107, after a certain elapsed time, the added metal ions are reduced by charged ions of the negative electrode to become metal precipitates 99, which are accumulated in the negative electrode tank 107. It is thought that since the solubility of metal precipitates 99 in the negative electrode electrolyte during charging is lower than that in the negative electrode electrolyte at the end of discharging, the precipitation reaction of metal precipitates 99 occurs irreversibly, and metal precipitates 99 are likely to be present. The metal precipitates 99 tend to have a higher specific gravity than the negative electrode active material and can be deposited on the bottom of the negative electrode tank 107 or the like. FIG. 3 illustrates the state in which Bi is deposited as metal precipitates 99 on the bottom of the negative electrode tank 107. In the RF battery system 1C, there is a possibility that the metal precipitates 99 accumulated on the bottom of the negative electrode tank 107 as described above may not be sufficiently recovered simply by mixing the electrolytes in the positive electrode tank 106 and the negative electrode tank 107 as in Embodiment 2.

Accordingly, in the method of operating an RF battery according to Embodiment 3, the electrolyte containing the added metal ions is not recovered into the positive electrode tank 106, but the metal precipitates 99 are stored in the negative electrode tank 107, and switching is performed between the positive electrode tank 106 and the negative electrode tank 107, which is considered to be equivalent to the operation of recovering the added metal ions into the positive electrode electrolyte.

Mixing Step

Specifically, when it is determined that metal precipitates 99 are accumulated in the negative electrode tank 107, by opening the valve 24 of the communicating pipe 14 (op), the positive electrode electrolyte in the positive electrode tank 106 and the negative electrode electrolyte in the negative electrode tank 107 are mixed, and the mixed solution is stored in the positive electrode tank 106 and the negative electrode tank 107. The mixing can be performed at the time when the state of charge (SOC) is 50% or more, or further 60% or more, 70% or more, or 80% or more, or at the end of charging when the SOC is sufficiently high. In the case where mixing is performed at the end of charging, in consideration of charging performed after switching as will be described later, it is preferable to adjust the charging conditions such that the SOC at the end of charging does not reach 100%. In consideration of charging after switching, the embodiment is considered to be easily used when the mixing is performed at the time when the SOC is 50% to about 70%.

In the method of operating an RF battery according to Embodiment 3, by opening the valve 24 of the communicating pipe 14, as shown in the diagram on the right of FIG. 3, about half of the amount of the added metal ions contained in the positive electrode electrolyte can be moved to the negative electrode tank 107. The diagram on the right of FIG. 3 illustrates the state in which the added metal ions: $1 \times Bi^{3+}$ in the positive electrode tank 106 have been divided equally, $(½) \times Bi^{3+}$ each, between the positive electrode tank 106 and the negative electrode tank 107. At this time, about half of the amount of charged Mn ions (mainly $Mn^{3+}$) are also moved from the positive electrode tank 106 to the negative electrode tank 107. Diffusion of the added metal ions occurs faster than oxidation of the metal precipitates 99 by the charged Mn ions or the charged ions of the negative electrode, and the metal precipitates 99 in the negative electrode tank 107 remain substantially as they are. Furthermore, as described above, it is thought that, since the solubility of the metal precipitates 99 is not very high, the oxidation reaction of the metal precipitates 99 does not occur very rapidly. When sufficient mixing is achieved, the valve 24 of the communicating pipe 14 is closed (cl). By performing the mixing step, the mixed solution containing the added metal ions is stored in the positive electrode tank 106 and the negative electrode tank 107.

Charging Step

As shown in the diagram on the left of FIG. 4, in the method of operating an RF battery according to Embodiment 3, the mixed solution is charged with the valve 24 being closed (cl). In this step, as in Embodiment 2, the charge voltage may be set to be the same as the end-of-charge voltage in the normal charging operation, but may be adjusted such that added metal ions are precipitated. By charging, the amount of charged ions of negative electrode is increased in the mixed solution inside the negative electrode tank 107. That is, charged ions of the negative electrode and charged Mn ions introduced by the mixing step are present in sufficient amounts in the mixed solution inside the negative electrode tank 107. The added metal ions in the negative electrode tank 107 are reduced by these charged ions to precipitate metal precipitates 99, and the amount of metal precipitates 99 inside the negative electrode tank 107 increases. The diagram on the left of FIG. 4 illustrates the state in which the amount of Bi as the metal precipitates 99 is increased inside the negative electrode tank 107. It is preferable to perform charging until substantially all of the amount of the added metal ions introduced into the negative electrode tank 107 in the mixing step are precipitated as metal precipitates 99.

In the method of operating an RF battery according to Embodiment 3, the mixing step and the charging step may be performed once, but by repeating a plurality of times, a larger amount of the added metal ions in the positive electrode tank 106 can be made to be present, as metal precipitates 99, in the negative electrode tank 107. As the number of repeats is increased, substantially all of the amount of the added metal ions in the positive electrode tank 106 can be made to be present as metal precipitates 99 in the negative electrode tank 107. However, when the number of repeats is excessively large, it takes time. The practical number of repeats may be five or less, for example, two to four. While appropriately checking the existence of the metal precipitates 99 by using the detecting portion 40, the number of repeats may be decided.

Dissolution Step

In the method of operating an RF battery according to Embodiment 3, after charging, switching is performed between the positive electrode tank 106 that stores the mixed solution which does not substantially contain added metal ions or in which the amount of added metal ions is sufficiently decreased and the negative electrode tank 107 that stores the mixed solution which substantially contains, as metal precipitates 99, the added metal ions contained in the positive electrode electrolyte before operation. That is, the negative electrode tank 107 in which the metal precipitates 99 are present is changed to the positive electrode tank. For example, by physically detaching the positive electrode tank 106 and the negative electrode tank 107 from the pipes 108 to 111, the two electrode tanks may be replaced with each other. However, since the tanks that store the electrolytes (mixed solution in this case) are heavy, this method is inferior in terms of workability. Accordingly, in the RF battery system 1C according to Embodiment 3, by using the branching introducing pipes 16 and 17, the branching return pipes 18 and 19, and the valves 26 to 29 and 34 to 37, switching between the two electrode tanks is performed.

In the method of operating an RF battery according to Embodiment 3, specifically, as shown in the diagram on the right of FIG. 4, the valves 26 to 29 provided on the branching introducing pipes 16 and 17 and the branching return pipes 18 and 19 are opened (op) and the valves 34 to 37 provided on the pipes 108 to 111 are closed (cl). In such a manner, the mixed solution from the positive electrode tank 106 can be supplied via the upstream side pipe 108→the branching introducing pipe 16 for negative electrode→the upstream side pipe 109 to the negative electrode 105. The solution which has passed through the negative electrode 105 can be returned via the downstream side pipe 111→the branching return pipe for negative electrode 18→the downstream side pipe 110 to the positive electrode tank 106. That is, the positive electrode tank 106 can be changed to the negative electrode tank. The mixed solution from the negative electrode tank 107 can be supplied via the upstream side pipe 109→the branching introducing pipe for positive electrode 17→the upstream side pipe 108 to the positive electrode 104. The solution which has passed through the positive electrode 104 can be returned via the downstream side pipe 110→the branching return pipe for positive electrode 19→the downstream side pipe 111 to the negative electrode tank 107. That is, the negative electrode tank 107 can be changed to the positive electrode tank.

As described above, in the method of operating an RF battery according to Embodiment 3, charging is performed in the state in which the electrolyte can be supplied from the positive electrode tank 106 (negative electrode tank after switching) to the negative electrode 105, and the electrolyte can be supplied from the negative electrode tank 107 (positive electrode tank after switching) to the positive electrode 104. By the charging, the metal precipitates 99 stored in the negative electrode tank 107 (positive electrode tank after switching) are oxidized by charged Mn ions and the like to the added metal ions, which are recovered into the exchanged positive electrode tank.

In addition, in the method of operating an RF battery according to Embodiment 3, by switching between positive and negative output terminals (not shown) connected to the alternating current/direct current converter 200 (FIG. 7), the positive electrode cell 102 can be changed to a negative electrode cell, and the negative electrode cell 103 can be changed to a positive electrode cell. By switching between the terminals, it is possible to achieve the same state as that in which the positive electrode tank 106 is changed to the negative electrode tank, and the negative electrode tank 107 is changed to the positive electrode tank.

In the method of operating an RF battery according to Embodiment 3, as described above, after actively moving the added metal ions from the positive electrode tank 106 to the negative electrode tank 107, switching between the negative electrode tank 107 and the positive electrode tank is performed, and then charging is performed. In such a manner, the metal precipitates 99 in the exchanged tank can be dissolved and ionized in the positive electrode electrolyte (mixed solution in this case), and the added metal ions can be recovered into the positive electrode electrolyte. When a recovery operation is performed next, the positive electrode tank 106 considered as the negative electrode tank is changed to a positive electrode tank again. In the method of operating an RF battery according to Embodiment 3, the operation of switching between the two electrode tanks is repeatedly performed.

Advantages

In the RF battery system 1C according to Embodiment 3, as in Embodiment 1, since the positive electrode electrolyte has a specific liquid composition containing manganese ions and added metal ions, it is possible to suppress precipitation of manganese dioxide due to the added metal ions. Furthermore, by carrying out the method of operating an RF battery according to Embodiment 3, the added metal ions which have moved from the positive electrode electrolyte to the negative electrode electrolyte can be easily recovered into the positive electrode electrolyte. In particular, in the method of operating an RF battery according to Embodiment 3, by using the RF battery system 1C according to Embodiment 3, after actively moving the added metal ions from the positive electrode tank 106 to the negative electrode tank 107 (after performing the mixing step), the added metal ions contained in the circulating pathway of the negative electrode electrolyte are precipitated inside the negative electrode tank 107 to collect the metal precipitates 99 (the charging step is performed). Then, the negative electrode tank 107 is used as the positive electrode tank (the dissolution step is performed). In such a manner, by carrying out the method of operating an RF battery according to Embodiment 3 by using the RF battery system 1C according to Embodiment 3, the added metal ions can be efficiently recovered into the positive electrode electrolyte. Consequently, in the RF battery system 1C according to Embodiment 3, by carrying out the method of operating an RF battery according to Embodiment 3, the effect of suppressing precipitation of manganese dioxide due to incorporation of the added metal ions into the positive electrode electrolyte can be maintained over a long period of time.

Embodiment 4

Figure 5:
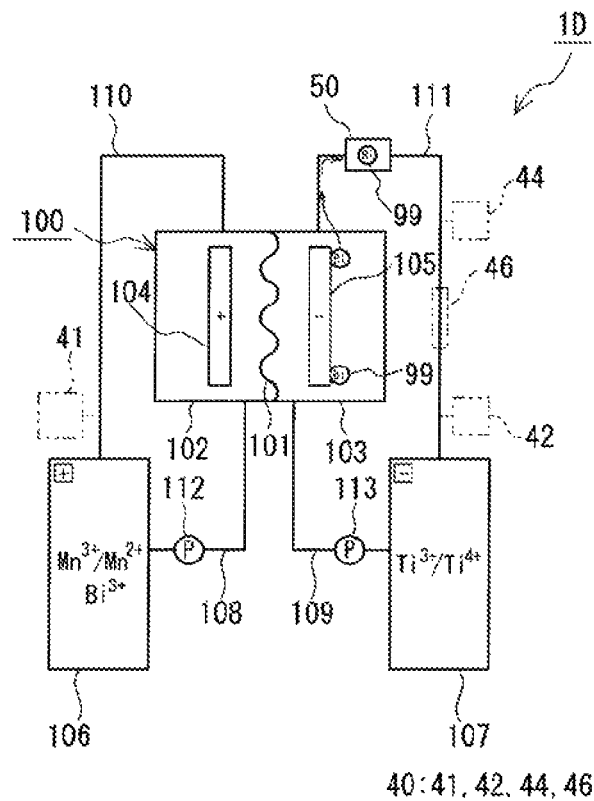
FIG. 5 is a schematic diagram of a redox flow battery system according to Embodiment 4.

With reference to FIG. 5, an RF battery system 1D according to Embodiment 4 and a method of operating an RF battery by using the RF battery system 1D will be described The basic structure and the composition of electrolytes used of the RF battery system 1D are the same as those of the RF battery system 1 described above (also refer to FIG. 7). The RF battery system 1D is characterized in that a filter portion 50 that collects metal precipitates 99 is provided in the circulating pathway of the negative electrode electrolyte. Characteristic points will be described in detail below, and a detailed description will be omitted about other constituent members, the composition of electrolytes, and the like.

RF Battery System
Filter Portion

In the example shown in FIG. 5, the RF battery system 1D according to Embodiment 4 includes a filter portion 50 provided on the downstream side pipe 111 of the negative electrode. As the filter portion 50, an appropriate one that can collect metal precipitates 99, typically, fine metal particles, can be used. As the filter portion 50, for example, a porous filter made of a material having resistance to electrolyte, in particular, acid resistance or the like can be used. Examples of the material include carbon, polyethylene, polypropylene, polytetrafluoroethylene, and polyvinylidene fluoride. One filter portion 50 may be provided as shown in this example. When a plurality of filter portions 50 are provided, it is possible to more reliably collect the metal precipitates 99. However, an excessively large number of filter portions 50 produces flow resistance of the negative electrode electrolyte, resulting in a decrease in the flow rate or the like. Therefore, although depending on the size of the filter portion 50, the number of filter portions 50 is preferably 3 or less, and more preferably 2 or less.

The installation position of the filter portion 50 can be appropriately selected. For example, the filter portion 50 can be installed on the upstream side pipe 109. As shown in this example, when the installation position of the filter portion 50 is set on the downstream side pipe 111, the loss of the pump 113 is likely to be decreased.

Since the filter portion 50 directly collects metal precipitates 99, it can also be used to detect the existence of metal precipitates 99. That is, the filter portion 50 can also function as the detecting portion 40 described in Embodiments 1 to 3. Consequently, in the RF battery system 1D according to Embodiment 4, a detecting portion 40 may not be provided separately. When the RF battery system 1D includes both the filter portion 50 and the detecting portion 40, since the existence of metal precipitates 99 can be confirmed first by the detecting portion 40, it is not necessary to remove the filter portion 50 excessively, leading to excellent workability.

Note that, in Embodiments 1 to 3, a filter portion 50 can be provided instead of or in addition to the detecting portion 40.

Method of Operating an RF Battery

A description will be made on the procedure of a method of operating an RF battery according to Embodiment 4 in which the operation of recovering added metal ions into the positive electrode electrolyte is performed by using the RF battery system 1D according to Embodiment 4.

In the RF battery system 1D, as in the RF battery system 1A, a positive electrode electrolyte containing manganese ions and added metal ions is used, and the electrolytes prepared before operation are continuously used. Accordingly, the added metal ions move from the positive electrode electrolyte to the negative electrode electrolyte, and metal precipitates can be contained in the negative electrode electrolyte. In the method of operating an RF battery according to Embodiment 4, the metal precipitates are recovered as ions into the positive electrode electrolyte, and in particular, the method is characterized in that the metal precipitates are directly collected by the filter portion 50 and dissolved in the positive electrode electrolyte. The characteristic point will be described in detail below, and a detailed description will be omitted about the same points as those of Embodiment 1.

Detection Step

In the RF battery system 1D, as in Embodiment 1, the existence of the metal precipitates in the circulating pathway of the negative electrode electrolyte is detected by a detecting portion 40 or a filter portion 50. When it is determined that metal precipitates are contained in the circulating pathway of the negative electrode electrolyte and that it is better to perform a recovery operation into the positive electrode electrolyte, the dissolution step described below is performed during the standby period or the like when the normal charging and discharging operation is not performed.

Dissolution Step

In the RF battery system 1D, the metal precipitates 99 adhering to the filter portion 50 are, for example, fed in the positive electrode tank 106 and dissolved and ionized. In particular, at the end of charging, charged Mn ions that can oxidize the metal precipitates 99 are contained in sufficient amounts in the positive electrode tank 106. Therefore, it is believed to be practical to collect the metal precipitates 99 from the filter portion 50 and to add the metal precipitates 99 to the positive electrode tank 106 at the end of charging. In the case where the metal precipitates 99 collected from the filter portion 50 are added to the positive electrode tank 106 in the low state of charge (SOC) or at the end of discharging, by performing charging after the addition, as in Embodiment 3, the metal precipitates 99 can be easily ionized by charged Mn ions.

In the method of operating an RF battery according to Embodiment 4, as described above, after the metal precipitates 99 precipitated in the circulating pathway of the negative electrolyte are collected by the filter portion 50, the metal precipitates 99 are added into the positive electrode electrolyte and dissolved/ionized, and thus, the added metal ions can be recovered into the positive electrode electrolyte.

Advantages

In the RF battery system 1D according to Embodiment 4, as in Embodiment 1, since the positive electrode electrolyte has a specific liquid composition containing manganese ions and added metal ions, it is possible to suppress precipitation of manganese dioxide due to the added metal ions. Furthermore, by carrying out the method of operating an RF battery according to Embodiment 4, the added metal ions which have moved from the positive electrode electrolyte to the negative electrode electrolyte can be easily recovered into the positive electrode electrolyte. In particular, in the method of operating an RF battery according to Embodiment 4, by performing a simple operation of directly collecting the metal precipitates 99 with the filter portion 50 and adding the collected metal precipitates 99 to the positive electrode electrolyte, the added metal ions can be efficiently recovered into the positive electrode electrolyte. Consequently, in the RF battery system 1D according to Embodiment 4, by carrying out the method of operating an RF battery according to Embodiment 4, the effect of suppressing precipitation of manganese dioxide due to incorporation of the added metal ions into the positive electrode electrolyte can be maintained over a long period of time.

Modification Example 1

As described above, in addition to combinations of Embodiment 4 including the filter portion 50 with the RF battery systems 1A to 1C according to Embodiments 1 to 3, the RF battery system 1B according to Embodiment 2 and the RF battery system 1C according to Embodiment 3 can be combined. In such a case, the branching introducing pipe 10 provided in Embodiment 2 may be considered to be the branching introducing pipe 16 on the negative electrode side provided in Embodiment 3, and the branching return pipe 12 provided in Embodiment 2 may be considered to be the branching return pipe 18 on the negative electrode side provided in Embodiment 3. By constructing an RF battery system in which Embodiments 1 to 4 are appropriately combined, it is possible to carry out the methods of operating an RF battery according to Embodiments 1 to 4 in combination, and it is expected that the added metal ions which have moved from the positive electrode electrolyte to the negative electrode electrolyte can be more effectively recovered.

On the basis of test examples, the effect of suppressing precipitation of manganese dioxide in the RF battery system according to the embodiment, and the effect of recovering added metal ions by the method of operating an RF battery will be specifically described below.

Test Example 1

An RF battery system 1 having the basic structure described with reference to FIG. 7 was constructed, and an examination was made of the effect obtained by incorporating added metal ions, in addition to manganese ions, into the positive electrode electrolyte.

In this test, in all samples, an acid aqueous solution containing manganese ions and titanium ions was used as each of the positive electrode electrolyte and the negative electrode electrolyte. Furthermore, in all samples, manganese sulfate, titanium sulfate, and sulfuric acid were used as starting materials, and regarding samples containing added metal ions, bismuth sulfate was further used.

In Sample Nos. 1-1 and 1-2, a positive electrode electrolyte containing bismuth ions ($Bi^{3+}$) as added metal ions was prepared.

In the positive electrode electrolyte of Sample No. 1-1, starting materials were adjusted such that the concentration of manganese ions was 1.0 M, the concentration of titanium ions was 1.0 M, the concentration of sulfate ions was 5.15 M, and the concentration of bismuth ions was 0.1 M.

In the positive electrode electrolyte of Sample No. 1-2, starting materials were adjusted such that the concentration of manganese ions was 1.0 M, the concentration of titanium ions was 1.0 M, the concentration of sulfate ions was 5.03 M, and the concentration of bismuth ions was 0.02 M.

In Sample No. 1-100, a positive electrode electrolyte containing manganese ions and titanium ions but not containing bismuth ions was prepared. In the positive electrode electrolyte, the concentration of manganese ions was 1.0 M, the concentration of titanium ions was 1.0 M, and the concentration of sulfate ions was 5.0 M.

In all samples, the solution used as the negative electrode electrolyte was the same as that of the positive electrode electrolyte. That is, in Sample Nos. 1-1 and 1-2, the negative electrode electrolyte contained bismuth ions in addition to manganese ions and titanium ions.

In an RF battery system 1 shown in FIG. 7, using the two electrode electrolytes prepared, charging was performed under the conditions described below, and it was visually checked whether or not precipitates (manganese dioxide in this example) were precipitated in the positive electrode electrolyte. The results thereof are shown in Table 1.

In the battery cell, electrodes (9 $cm^2$) made of carbon felt and a cation-exchange membrane were used.

Charging was performed under conditions in which the charge current was set to be 315 mA, and the end-of-charge voltage was set to be 2 V. In this test, by controlling the charging time, the RF battery was charged until the set SOC shown in Table 1 was reached, and the RF battery was left to stand at room temperature (25° C.) and brought into a standby state. Regarding the RF battery system in a standby state, it was visually observed whether or not precipitates were generated. The precipitates are typical observed as deposits in the positive electrode electrolyte. The SOC was obtained on the basis of the formula described below. Faraday constant is 96,485 (A·sec/mol).

State of charge (%)=(amount of charged electricity/theoretical amount of electricity of one-electron reaction)×100

Amount of charged electricity (A·h)=charge current (A)×charging time (h)

Theoretical amount of electricity of one-electron reaction (A·h)=volume of electrolyte (L)×concentration of manganese ions (mol/L)×Faraday constant×1(electron)/3,600

TABLE 1

| Sample No. | Concentration of bismuth ions (M) | Positive electrode SOC (%) | Time until generation of precipitates |
|---|---|---|---|
| 1-100 | 0 | 70 | About 1 day |
|  |  | 90 | About 0.1 days (about 2.5 hours) |

TABLE 1-continued

| Sample No. | Concentration of bismuth ions (M) | Positive electrode SOC (%) | Time until generation of precipitates |
|---|---|---|---|
| 1-1 | 0.1 | 90 | Not generated at the elapsed time of 30 days |
| 1-2 | 0.02 | 90 | About 7 days |

As shown in Table 1, it is evident that, in the RF battery system 1, by incorporating added metal ions, in addition to manganese ions, into the positive electrode electrolyte, precipitation of precipitates, such as manganese dioxide, in the positive electrode electrolyte can be suppressed. It is evident that, in Sample No. 1-100 in which the positive electrode electrolyte not containing added metal ions is used, as the SOC increases, precipitates (manganese dioxide) can be precipitated early. In contrast, in Sample Nos. 1-1 and 1-2, as the concentration of added metal ions increases (as the content increases), the effect of suppressing precipitation increases, and even when the SOC is increased, precipitation can be sufficiently suppressed. In this test, when the content of added metal ions is 0.1 M, it was not possible to visually check precipitates (manganese dioxide) even at the elapsed time of 30 days (Sample No. 1-1). This test shows that the concentration of added metal ions in the positive electrode electrolyte is preferably 0.01 M or more, 0.02 M or more, 0.05 M or more, or 0.1 M or more.

Test Example 2

An RF battery system 1B according to Embodiment 2 described with reference to FIG. 2 was constructed, and by performing charging and discharging using a positive electrode electrolyte containing manganese ions and added metal ions, the change in battery capacity over time was examined.

In this test, an acid aqueous solution containing manganese ions and titanium ions was used as each of the positive electrode electrolyte and the negative electrode electrolyte. The positive electrode electrolyte was prepared so as to further contain bismuth ions as added metal ions. The negative electrode electrolyte was prepared so as to contain manganese ions and titanium ions but not contain bismuth ions. As starting materials, manganese sulfate, titanium sulfate, and sulfuric acid were used for the two electrodes, and bismuth sulfate was further used for the positive electrode.

In the positive electrode electrolyte, starting materials were adjusted such that the concentration of manganese ions was 1 M, the concentration of titanium ions was 1 M, the concentration of sulfate ions was 5.15 M, and the concentration of bismuth ions was 0.1 M.

In the negative electrode electrolyte, starting materials were adjusted such that the concentration of manganese ions was 1 M, the concentration of titanium ions was 1 M, and the concentration of sulfate ions was 5 M.

In the battery cell, electrodes (500 cm$^2$) made of carbon felt and a cation-exchange membrane were used.

In this test, charging and discharging conditions were set such that the SOC did not exceed 90%. Specifically, charging and discharging were performed under conditions in which the charge-discharge current was set to be 25 A, the end-of-charge voltage was set to be 1.5 V, the end-of-discharge voltage was set to be 1.0 V, and charging and discharging at constant current (charging and discharging with the charge-discharge current being fixed at the value described above) were repeated. The charge and discharge test was carried out at room temperature (25° C. in this example).

Figure 6:
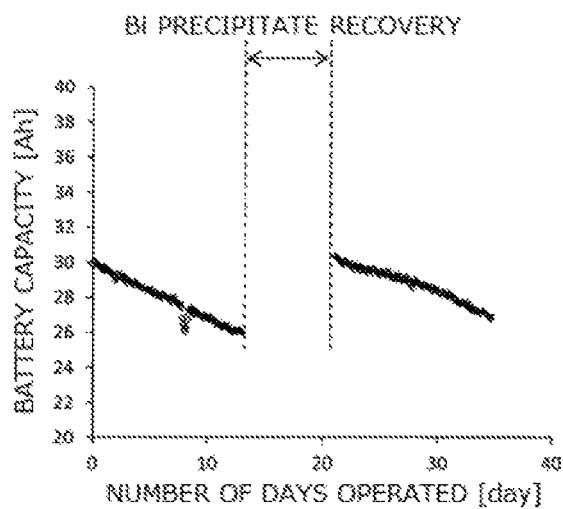
FIG. 6 is a graph showing the relationship between the number of days operated during which charging and discharging were performed by using the redox flow battery system according to Embodiment 2 and the battery capacitance in the case where added metal ions were recovered in the middle of the charging and discharging operation.

Charging and discharging were repeated, and the battery capacity was measured over time. The results thereof are shown in the graph of FIG. 6. In the graph of FIG. 6, the horizontal axis represents the number of days (day) when charging and discharging were performed, and the vertical axis represents the battery capacity (Ah). The battery capacity was obtained from the following formula:

Battery capacity (A·h)=discharge current (A)×discharge time (h)

In the RF battery system 1B according to Embodiment 2, by incorporating added metal ions into the positive electrode electrolyte (by incorporating 0.1 M of bismuth ions as in Sample No. 1-1 of Test Example 1), precipitation of manganese dioxide can be suppressed, but as shown in FIG. 6, it is evident that the battery capacity decreases over time. In this test, the battery capacity at the beginning of the operation was about 30 Ah, and as a result of repeating charging and discharging, the battery capacity after 13 days was about 26 Ah. The concentration of bismuth ions in the positive electrode electrolyte after 13 days was measured by inductively-coupled plasma emission spectrometry to be 0.08 M, while it was 0.1 M before operation. On the other hand, when the negative electrode electrolyte was visually checked, precipitates were observed. Composition analysis showed that the precipitates were composed of solid bismuth (Bi). From this, it is believed that the added metal ions (bismuth ions) in the positive electrode electrolyte moved to the negative electrode electrolyte over time and were reduced in the negative electrode electrolyte to become metal precipitates (solid bismuth). Furthermore, it is believed that the added metal ions in the negative electrode electrolyte were reduced by charged ions of the negative electrode, and since the SOC of the negative electrode electrolyte became lower than the SOC of the positive electrode electrolyte, the battery capacity decreased from the value at the beginning of the operation.

In the state in which the added metal ions moved from the positive electrode electrolyte to the negative electrode electrolyte and were able to be present as metal precipitates in the circulating pathway of the negative electrode electrolyte as described above, in the RF battery system 1B according to Embodiment 2, by carrying out the method of operating an RF battery according to Embodiment 2 including the mixing step, the charging step, and the dissolution step, the operation of recovering the added metal ions into the positive electrode electrolyte (Bi recovery operation) was performed. In FIG. 6, in the period from day 14 to day 21 in which graph is disconnected, the recovery operation was performed.

After the operation of recovering the added metal ions into the positive electrode electrolyte (Bi recovery operation) was performed, the concentration of bismuth ions in the positive electrode electrolyte was measured by inductively-coupled plasma emission spectrometry to be 0.094 M. That is, by the recovery operation, it was possible to make the concentration of the added metal ions in the positive electrode electrolyte substantially equal to the concentration (0.1 M) before operation. After the recovery operation, when charging and discharging were performed under the same conditions as those before the recovery operation, the same tendency as that before the recovery operation was seen. That is, the battery capacity immediately after the recovery operation is about 30 Ah, but as shown in FIG. 6, it is evident that the battery capacity decreases over time.

This test confirms that, in the case where a positive electrode electrolyte containing added metal ions in addition to manganese ions is used, by recovering the added metal ions moved from the positive electrode electrolyte to the negative electrode electrolyte over time and metal precipitates into the positive electrode electrolyte, the effect of suppressing precipitation of manganese dioxide can be maintained substantially equal to that of the unused solution before operation or the solution at the beginning of the operation over a long period of time.

Furthermore, it is evident from Test Examples 1 and 2 that, regarding the unused solution before operation, by setting the concentration of added metal ions in the positive electrode electrolyte to be 0.001 M or more, preferably 0.01 M or more, and by maintaining 0.001 M or more even if the concentration decreases over time, it is possible to sufficiently obtain the effect of suppressing precipitation of manganese dioxide. In other words, until the concentration of added metal ions in the positive electrode electrolyte becomes about 0.001 M, even when the added metal ions have moved from the positive electrode electrolyte to the negative electrode electrolyte, precipitation of manganese dioxide can be suppressed at the positive electrode. In consideration of securing high battery capacity, it is thought to be preferable to maintain 0.01 M or more even if the concentration decreases over time.

The present invention is not limited to the examples shown above, but is defined by appended claims, and is intended to include all modifications within the meaning and scope equivalent to those of the claims.

For example, in Test Examples 1 and 2, the case where each of the positive electrode electrolyte and the negative electrode electrolyte contains manganese ions and titanium ions is shown. However, the following modifications are possible:

1. The positive electrode electrolyte does not contain titanium ions, and the negative electrode electrolyte does not contain manganese ions.

2. As the added metal ions, antimony ions are used instead of bismuth ions, or bismuth ions and antimony ions are used.

3. The negative electrode active material is changed from titanium ions to another species of ions. In this case, the added metal ions are selected such that the standard redox potential of the added metal ions is higher than the standard redox potential of ions of the negative electrode active material.

For example, when vanadium ions are used as the negative electrode active material, the added metal ions may be at least one selected from four species of ions, excluding cadmium ions from the five species of ions enumerated above. For example, when cadmium ions are used as the negative electrode active material, the added metal ions may be at least one selected from the five species of ions.

4. At least one of the concentration of each species of metal ions, the type of acid used as a solvent, the concentration of the acid, the material of the electrodes, the size of the electrodes, and the material of the membrane is changed.

For example, in Test Example 2, the case where the operation of recovering added metal ions into the positive electrode electrolyte by using the RF battery system according to Embodiment 2 and the method of operating an RF battery according to Embodiment 2 is shown. However, the same advantageous effects can be obtained even by using the RF battery system and the method of operating an RF battery according to Embodiment 1, 3, or 4.

INDUSTRIAL APPLICABILITY

Redox flow battery systems according to the present invention can be used for large-capacity storage batteries, with respect to natural energy power generation, such as photovoltaic power generation or wind power generation, for the purpose of stabilizing fluctuation of power output, storing generated power during oversupply, leveling load, and the like. Furthermore, redox flow battery systems according to the present invention can be provided in a general power plant and suitably used as large-capacity storage batteries as countermeasures against instantaneous voltage drop/power failure and for the purpose of leveling load. The method of operating a redox flow battery according to the present invention can be carried out during a standby period when normal charging and discharging are not performed in the redox flow battery system according to the present invention.

The invention claimed is:

1. A method of operating a redox flow battery in which charging and discharging are performed by circulating and supplying a positive electrode electrolyte in a positive electrode tank to a positive electrode and circulating and supplying a negative electrode electrolyte in a negative electrode tank to a negative electrode,
   wherein the positive electrode electrolyte contains manganese ions and added metal ions;
   the negative electrode electrolyte contains at least one species of metal ions selected from the group consisting of titanium ions, vanadium ions, and chromium ions; and
   the added metal ions are at least one selected from the group consisting of cadmium ions, tin ions, antimony ions, lead ions, and bismuth ions,
   the method comprising a dissolution step in which, when metal precipitates, formed by reduction of the added metal ions which have moved from the positive electrode electrolyte to a circulating pathway of the negative electrode electrolyte, are contained in the circulating pathway of the negative electrode electrolyte, the metal precipitates are dissolved and ionized in the positive electrode electrolyte.

2. The method of operating a redox flow battery according to claim 1, wherein, in the dissolution step, when the metal precipitates are precipitated on the negative electrode, the metal precipitates precipitated on the negative electrode are dissolved by supplying the positive electrode electrolyte at the end of charging to the negative electrode.

3. The method of operating a redox flow battery according to claim 2, further comprising:
   before the dissolution step,
   a mixing step in which, at the end of discharging, the positive electrode electrolyte in the positive electrode tank and the negative electrode electrolyte in the negative electrode tank are mixed to form a mixed solution; and
   a charging step in which the mixed solution is charged so that the added metal ions contained in the mixed solution in the negative electrode tank are precipitated on the negative electrode.

4. The method of operating a redox flow battery according to claim 1, further comprising:
   a mixing step in which, when the state of charge is 50% or more, the positive electrode electrolyte in the positive electrode tank and the negative electrode electrolyte in the negative electrode tank are mixed to form a mixed solution; and a charging step in which the mixed solution is charged so that the added metal ions contained in the mixed solution in the negative electrode tank are precipitated and the metal precipitates are made to be present in the negative electrode tank, wherein the dissolution step includes switching between the negative electrode tank that stores the mixed solution containing the metal precipitates and the positive electrode tank, and charging the mixed solution in the exchanged positive electrode tank.

5. The method of operating a redox flow battery according to claim 4, wherein the mixing step and the charging step are repeated a plurality of times.

6. The method of operating a redox flow battery according to claim 1, further comprising a collection step in which the metal precipitates are collected by a filter portion provided in the circulating pathway of the negative electrode electrolyte, wherein, in the dissolution step, the collected metal precipitates are dissolved in the positive electrode electrolyte.

7. A redox flow battery system comprising a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode, wherein the positive electrode electrolyte contains manganese ions and added metal ions;

the negative electrode electrolyte contains at least one species of metal ions selected from the group consisting of titanium ions, vanadium ions, and chromium ions; and the added metal ions are at least one selected from the group consisting of cadmium ions, tin ions, antimony ions, lead ions, and bismuth ions, the redox flow battery system comprising:

a detecting portion that detects the existence of metal precipitates formed by reduction of the added metal ions which have moved from the positive electrode electrolyte to a circulating pathway of the negative electrode electrolyte; and a branching introducing pipe that supplies the positive electrode electrolyte from the positive electrode tank to the negative electrode when the metal precipitates are contained in the circulating pathway of the negative electrode electrolyte, and a branching return pipe that returns the solution which has passed through the negative electrode to the positive electrode tank.

8. The redox flow battery system according to claim 7, wherein the detecting portion includes at least one selected from an SOC measuring unit capable of measuring the state of charge of the positive electrode electrolyte and the state of charge of the negative electrode electrolyte, a transparent window provided in the circulating pathway of the negative electrode electrolyte, and a flow meter provided in the circulating pathway of the negative electrode electrolyte.

9. The redox flow battery system according to claim 7, wherein the positive electrode electrolyte and the negative electrode electrolyte both contain manganese ions and titanium ions.

10. The redox flow battery system according to claim 7, wherein the concentration of the added metal ions in the positive electrode electrolyte is 0.001 to 1 M.

11. The redox flow battery system according to claim 7, wherein at least one of the concentration of the manganese ions in the positive electrode electrolyte and the concentration of the metal ions in the negative electrode electrolyte is 0.3 to 5 M.

12. A redox flow battery system comprising a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode, wherein the positive electrode electrolyte contains manganese ions and added metal ions;

the negative electrode electrolyte contains at least one species of metal ions selected from the group consisting of titanium ions, vanadium ions, and chromium ions; and the added metal ions are at least one selected from the group consisting of cadmium ions, tin ions, antimony ions, lead ions, and bismuth ions, the redox flow battery system comprising:

a detecting portion that detects the existence of metal precipitates formed by reduction of the added metal ions which have moved from the positive electrode electrolyte to a circulating pathway of the negative electrode electrolyte; and a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe that supplies the mixed solution stored in the positive electrode tank to the negative electrode; and a branching return pipe that returns the solution which has passed through the negative electrode to the positive electrode tank.

13. A redox flow battery system comprising a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode, wherein the positive electrode electrolyte contains manganese ions and added metal ions;

the negative electrode electrolyte contains at least one species of metal ions selected from the group consisting of titanium ions, vanadium ions, and chromium ions; and the added metal ions are at least one selected from the group consisting of cadmium ions, tin ions, antimony ions, lead ions, and bismuth ions, the redox flow battery system comprising:

a detecting portion that detects the existence of metal precipitates formed by reduction of the added metal ions which have moved from the positive electrode electrolyte to a circulating pathway of the negative electrode electrolyte; and a communicating pipe that allows the positive electrode tank and the negative electrode tank to communicate with each other, enabling mixing of the positive electrode electrolyte and the negative electrode electrolyte, when the metal precipitates are contained in the circulating pathway of the negative electrode electrolyte; a branching introducing pipe for negative electrode that supplies the mixed solution stored in the positive electrode tank to the negative electrode; a branching return pipe for negative electrode that returns the solution which has passed through the negative electrode to the positive electrode tank; a branching introducing pipe for positive electrode that supplies the mixed solution stored in the negative electrode tank to the positive electrode; and a branching return pipe for positive electrode that returns the solution which has passed through the positive electrode to the negative electrode tank.

14. A redox flow battery system comprising a battery cell including a positive electrode, a negative electrode, and a membrane interposed between the two electrodes, a positive electrode tank that stores a positive electrode electrolyte to be circulated and supplied to the positive electrode, and a negative electrode tank that stores a negative electrode electrolyte to be circulated and supplied to the negative electrode, wherein the positive electrode electrolyte contains manganese ions and added metal ions;

the negative electrode electrolyte contains at least one species of metal ions selected from the group consisting of titanium ions, vanadium ions, and chromium ions; and the added metal ions are at least one selected from the group consisting of cadmium ions, tin ions, antimony ions, lead ions, and bismuth ions, the redox flow battery system comprising:

a detecting portion that detects the existence of metal precipitates formed by reduction of the added metal ions which have moved from the positive electrode electrolyte to a circulating pathway of the negative electrode electrolyte; and a filter portion that is provided in the circulating pathway of the negative electrode electrolyte and collects the metal precipitates.

\* \* \* \* \*